(12) United States Patent
Savino

(10) Patent No.: US 11,541,364 B2
(45) Date of Patent: Jan. 3, 2023

(54) FOOD AND BEVERAGE PRODUCT

(71) Applicant: Plant Tap, LLC, North Salem, NY (US)

(72) Inventor: Joseph Camillo Savino, North Salem, NY (US)

(73) Assignee: Plant Tap, Inc., Brewster, NY (US)

(*) Notice: Subject to any disclaimer, the term of this patent is extended or adjusted under 35 U.S.C. 154(b) by 414 days.

(21) Appl. No.: 16/409,759

(22) Filed: May 10, 2019

(65) Prior Publication Data
US 2019/0344233 A1    Nov. 14, 2019

Related U.S. Application Data

(60) Provisional application No. 62/821,644, filed on Mar. 21, 2019, provisional application No. 62/802,693, (Continued)

(51) Int. Cl.
*B01F 35/00* (2022.01)
*B01F 35/83* (2022.01)
(Continued)

(52) U.S. Cl.
CPC ............ *B01F 35/832* (2022.01); *A23C 11/02* (2013.01); *A23C 11/103* (2013.01); *A23L 2/52* (2013.01);
(Continued)

(58) Field of Classification Search
CPC .................. B01F 35/832; B01F 23/471; B01F 35/717611; B01F 27/091; B01F 23/47;
(Continued)

(56) References Cited

U.S. PATENT DOCUMENTS 2,614,738 A  10/1952 Mills
3,251,550 A  5/1966 Axel et al.
(Continued)

FOREIGN PATENT DOCUMENTS

CN  104782773 A  7/2006
CN  104799281 A  7/2006
(Continued)

OTHER PUBLICATIONS

Nut Milk Wet Blending Machines, Aug. 15, 2016, https://www.alibaba.com/product-detail/nut-milk-wet-blending-machines_60465570199.html?spm=a2700.7724857.0.0.Pd0spa.

*Primary Examiner* — Anshu Bhatia
(74) *Attorney, Agent, or Firm* — Finnegan, Henderson, Farabow, Garrett & Dunner, L.L.P.

(57) ABSTRACT

System and method for dispensing a flowable product are provided. The system includes a mixing chamber having a first inlet, a second inlet and an outlet. The mixing chamber of the system contains a mixing element capable of motion. The system also includes a paste located in an enclosure configured to flow into the mixing chamber via a first channel connected to the first inlet, and a flowable medium configured to flow into the mixing chamber via a second channel connected to the second inlet. The mixing chamber is configured to mix the paste and the flowable medium using the mixing element, thus, producing the flowable product that may be output via the outlet.

15 Claims, 18 Drawing Sheets

Related U.S. Application Data filed on Feb. 7, 2019, provisional application No. 62/670,651, filed on May 11, 2018.

(51) Int. Cl.

| | | |
|---|---|---|
| *A23L 2/52* | (2006.01) | |
| *A23C 11/02* | (2006.01) | |
| *B01F 23/47* | (2022.01) | |
| *B01F 25/42* | (2022.01) | |
| *B01F 27/091* | (2022.01) | |
| *B01F 35/92* | (2022.01) | |
| *B01F 35/10* | (2022.01) | |
| *B01F 35/21* | (2022.01) | |
| *B01F 35/32* | (2022.01) | |
| *B01F 35/71* | (2022.01) | |
| *A23C 11/10* | (2021.01) | |
| *B01F 35/90* | (2022.01) | |
| *B01F 101/14* | (2022.01) | |

(52) U.S. Cl.
CPC .............. *B01F 23/47* (2022.01); *B01F 25/42* (2022.01); *B01F 27/091* (2022.01); *B01F 35/1453* (2022.01); *B01F 35/2113* (2022.01); *B01F 35/2117* (2022.01); *B01F 35/3204* (2022.01); *B01F 35/32045* (2022.01); *B01F 35/71805* (2022.01); *B01F 35/717611* (2022.01); *B01F 35/92* (2022.01); *A23V 2002/00* (2013.01); *B01F 23/471* (2022.01); *B01F 2035/98* (2022.01); *B01F 2101/14* (2022.01)

(58) Field of Classification Search
CPC .............. B01F 2101/14; B01F 2101/06; B01F 2101/2305; B01F 2101/08; B01F 2101/13; B01F 2101/07; B01F 2101/10; B01F 2101/18; B01F 2101/12; B01F 2101/2805; B01F 35/320445; B01F 35/2113; B01F 35/2117; A23C 11/02; A23L 2/52
See application file for complete search history.

(56) References Cited

U.S. PATENT DOCUMENTS

| | | |
|---|---|---|
| 3,542,342 A | 11/1970 | Barron |
| 3,857,977 A | 12/1974 | Huessy |
| 4,121,301 A * | 10/1978 | De Francisci ......... A21C 1/003 99/348 |
| 4,595,131 A | 6/1986 | Ruskin et al. |
| 4,643,906 A | 2/1987 | Pitz |
| 4,744,992 A | 5/1988 | Mitchell et al. |
| 4,759,472 A | 7/1988 | Stenger |
| 4,800,097 A | 1/1989 | Morris et al. |
| 4,871,373 A * | 10/1989 | Kiener ................. C01B 17/665 252/188.23 |
| 4,894,242 A | 1/1990 | Mitchell et al. |
| 5,018,646 A | 5/1991 | Billman et al. |
| 5,312,020 A | 5/1994 | Frei |
| 5,899,563 A | 5/1999 | Karras |
| 5,918,768 A | 7/1999 | Ford |
| 5,927,553 A | 7/1999 | Ford |
| 5,975,357 A | 11/1999 | Topar |
| 5,975,365 A | 11/1999 | Hsieh |
| 6,007,236 A | 12/1999 | Maguire |
| 6,123,976 A | 9/2000 | Stoddard |
| 6,153,247 A | 11/2000 | Stoddard |
| 6,293,693 B1 * | 9/2001 | Rodgers .................. B01F 23/47 366/195 |
| 6,419,120 B1 | 7/2002 | Bertone |
| 6,428,828 B1 | 8/2002 | Jackson et al. |
| 6,485,773 B1 | 11/2002 | Myers |
| 6,550,648 B2 | 4/2003 | Bardin |
| 6,553,779 B1 | 4/2003 | Boyer et al. |
| 6,874,660 B2 | 4/2005 | Bertone |
| 7,036,687 B1 | 5/2006 | Lowe |
| 7,368,140 B2 | 5/2008 | Tabata |
| 7,829,128 B2 | 11/2010 | Karwowski et al. |
| 8,333,301 B2 | 12/2012 | Majer |
| 8,695,483 B2 | 4/2014 | Koopman et al. |
| 2003/0230604 A1 | 12/2003 | Huffer |
| 2004/0035884 A1 | 2/2004 | de la Guardia |
| 2006/0157602 A1 | 7/2006 | Wang |
| 2006/0209624 A1 * | 9/2006 | Hoogland ............... B01F 33/84 366/160.1 |
| 2006/0249535 A1 | 11/2006 | Mauger et al. |
| 2007/0026128 A1 | 2/2007 | Jarrett |
| 2007/0128335 A1 | 6/2007 | Iwamoto et al. |
| 2007/0148318 A1 | 6/2007 | Rubio et al. |
| 2009/0236361 A1 | 9/2009 | Doelman et al. |
| 2011/0064862 A1 | 3/2011 | McCready |
| 2011/0086158 A1 | 4/2011 | Aremu et al. |
| 2012/0037660 A1 * | 2/2012 | Bacellar .............. B01F 35/7161 222/1 |
| 2013/0062366 A1 | 3/2013 | Tansey |
| 2013/0258799 A1 * | 10/2013 | Christy ............... B01F 35/2209 366/141 |
| 2014/0175124 A1 | 6/2014 | Nathan |
| 2014/0193563 A1 | 7/2014 | Carder et al. |
| 2014/0197202 A1 | 7/2014 | Soh et al. |
| 2015/0043302 A1 | 2/2015 | Kamiya et al. |
| 2015/0366254 A1 | 12/2015 | Kesler et al. |
| 2016/0114297 A1 | 4/2016 | Perez et al. |
| 2016/0338389 A1 | 11/2016 | Malone et al. |
| 2018/0035841 A1 * | 2/2018 | Savino .................. B01F 23/511 |

FOREIGN PATENT DOCUMENTS

| | | |
|---|---|---|
| CN | 201044718 Y | 4/2008 |
| CN | 191861894 B | 8/2012 |
| CN | 102836667 A | 12/2012 |
| CN | 103636804 A | 3/2014 |
| CN | 104286185 A | 1/2015 |
| CN | 104304480 A | 1/2015 |
| CN | 104397182 A | 3/2015 |
| CN | 104489103 A | 4/2015 |
| WO | WO 2006/128561 A1 | 12/2006 |
| WO | WO-2013/078510 A1 | 6/2013 |

* cited by examiner

FOOD AND BEVERAGE PRODUCT

The present disclosure relates to a system and method for forming a food and beverage product and more particularly, to a nut-based or grain-based food and beverage product. This application claims priority to U.S. Provisional application Ser. No. 62/670,651 entitled "FOOD AND BEVERAGE PRODUCT MIXING AND DISPENSING MACHINE," filed May 11, 2018, U.S. Provisional application Ser. No. 62/802,693 entitled "FOOD AND BEVERAGE PRODUCT MIXING AND DISPENSING MACHINE," filed Feb. 7, 2019, and U.S. Provisional application Ser. No. 62/821,644 entitled "FOOD AND BEVERAGE PRODUCT," filed Mar. 21, 2019, the disclosures of which are expressly incorporated by reference herein in their entireties for all purposes.

TECHNICAL FIELD

Background

In recent years, consumption of plant-based or non-dairy milk alternatives has significantly increased. Nowadays, cow milk allergy, lactose intolerance, calorie concern and preference to vegan diets have influenced consumers towards choosing cow milk alternatives. Additionally, people may prefer non-dairy alternatives due to concerns over saturated fat levels, hormone content, and antibiotic use in dairy cattle. Plant-based beverages may be derived, for example, from soy, various nuts or grains. Many retail plant-based products (e.g., almond-milk, cashew-milk, etc.), have numerous synthetic ingredients added to achieve a level of sterility for commercial distribution and retail sale. Additionally, retail products can have up to 20 ingredients such as gums, thickeners, vitamin packs, and preservatives that are added to this perishable liquid product to achieve an appealing taste, texture, color, etc., and to maintain that for commercially acceptable shelf life.

The commercial processes used to make commercial plant-based milk, such as nut milk, often occurs at high heat (e.g., 135° C./275° F.). This type of processing can cause degradations in flavor, color, and the smell of the milk. Also, a factor that drives up the cost of commercially distributed nut milk is the fact that they are water-based and must be refrigerated.

Making pure ("clean") plant-based beverages without preservatives is also challenging. These beverages usually contain only a few ingredients (e.g., nuts/nut paste and water), and may be too perishable to be sold through a distribution chain. Moreover, although the plant-based ingredients alone may not be perishable and can be stored at room temperature, those ingredients can become highly perishable once commercially processed with various liquids (e.g., water). Even the preservative-laced milk products may not last over a week in a consumer's refrigerator, due to transit times in distribution and time the product sits on a retail shelf before purchase.

Nut milk (e.g., almond milk) can be made in different ways. For example, nut milk can be produced by mixing nut powder (i.e., ground nuts) with other desired ingredients, such as water, spices, other flavorings, sweeteners, etc. Nut milk can alternatively be produced by mixing predetermined quantities of nut paste with other desired ingredients. Each technique for producing nut milk poses distinct challenges owing, in part, to the physical differences between nut powder and nut paste. For example, unlike nut powder, which typically has a dry, granular consistency, nut paste typically has a more fluidlike or pasty consistency caused by the release of natural oils from nut material during pulverization. These natural oils can "separate" from the more solid constituents of the nut paste over time, resulting in the formation of separate layers of different constituent materials in packaged nut paste.

The separation of constituent elements that occurs inside a package of nut paste poses challenges to producing high-quality nut milk from packaged nut paste. For example, it can be difficult to dispense a predetermined amount of packaged nut paste having the desired concentration of all constituent elements for mixing with other nut milk ingredients because the separation of nut paste constituents inside its packaging can result in disproportionate amounts of some separated constituents (e.g., heavy paste) exiting the packaging without proportional quantities of other constituents (e.g., oils). This can result in the production of poor-quality nut milk. This same challenge exists for other types of materials, including other food and beverage ingredients susceptible to separation, and is not limited to nut paste.

The present disclosure solves the problems related to fabrication of nut-based milk described above (e.g., the problems associated with commercial processing of nut-based milk, and the challenges associated with making pure ("clean") nut-based beverages). As described below, the invention mixes water with nut paste to make fresh nut milk on demand (i.e., the product is made fresh right in front of the customer), which negates the need for transporting refrigerated beverages (that can be 90% water). Thus, the present disclosure describes a beverage product mixing and dispensing system that may be used to overcome one or more of the problems set forth above and/or other problems of the prior art.

The present disclosure further describes a solution to problems related to fabrication grain-based milk containing dietary fibers. The beneficial health effects of dietary fibers are well-known. In this context, there has been a growing interest in food products made from grains, such as oats and barley. In many respects, oats are different than other grains. They have higher protein and fat content than comparable cereals as well as a high β-glucan content. Oat fibers have also been found to lower the serum cholesterol level of hypercholesteremic individuals. Moreover, oats contain protein of high food value as well as a considerable proportion of mono and polyunsaturated fats. In addition, oats contain many essential amino acids and minerals.

A great advantage of oats is that the whole grain can be used for making various products once the hull has been removed. In oats, the most nutritious substances are distributed fairly evenly in the whole grain. In other grains, the nutritious substances are frequently concentrated in specific parts of the grain.

Oats (also referred to as cereal) paste can be used in forming a milky product which can be used as an alternative to milk, especially for lactose-intolerant people. It may also be used as the basis of or an additive in the manufacture of ice-cream, gruel, yogurt, milkshakes, health drinks, and snacks. However, this process is time-consuming and may result in a product that may not have consistency and/or taste of milk. For example, the overall viscosity and/or sugar content of the cereal suspension may be difficult to control.

Accordingly, there is a need for providing systems and methods that improve the production of cereal paste. The present disclosure addresses the problems set forth above as well as other deficiencies in existing systems and methods. The disclosed system and methods further describe ways to form a milky product from the nut paste or cereal paste and to dispense the milky product to a consumer.

BRIEF DESCRIPTION OF THE DRAWINGS

The accompanying drawings are not necessarily to scale or exhaustive. Instead, the emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

SUMMARY

Figure 1:
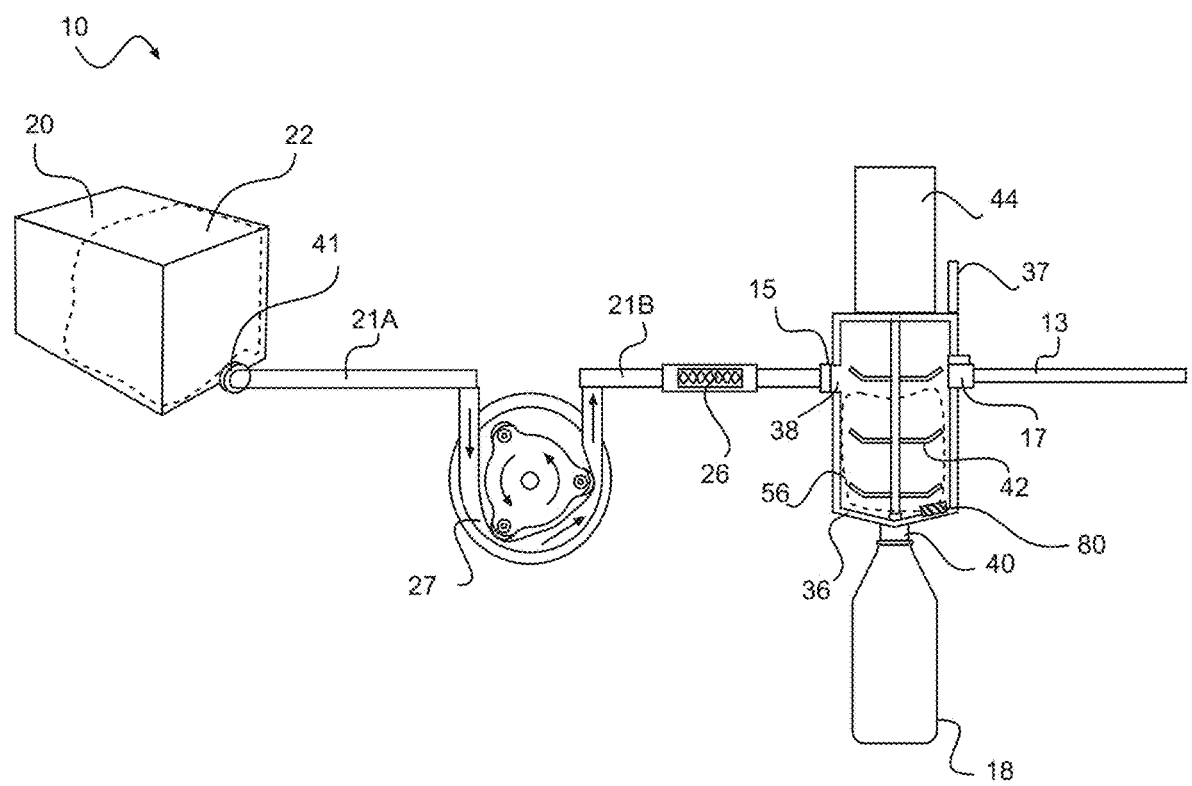
FIG. 1 is a schematic illustration of an exemplary disclosed system for producing a food or beverage product, consistent with embodiments of this disclosure.

Disclosed embodiments provide systems and methods for forming and dispensing a flowable product.

Consistent with a disclosed embodiment, a system for dispensing a flowable product is provided. The system may include a mixing chamber having a first inlet, a second inlet and an outlet, the mixing chamber containing a mixing element capable of motion, a paste located in an enclosure configured to flow into the mixing chamber via a first channel connected to the first inlet, and a flowable medium configured to flow into the mixing chamber via a second channel connected to the second inlet. The mixing chamber is configured to mix the paste and the flowable medium using the mixing element, thus, producing the flowable product that may be output via the outlet.

Consistent with another disclosed embodiment, a system for dispensing a plurality of flowable products is provided. The system may include a plurality of subsystems, where a subsystem from the plurality of subsystems may be configured to dispense a subsystem related flowable product. The subsystem may include a mixing chamber having a first inlet, a second inlet, and an outlet. The mixing chamber may include a mixing element capable of motion. The subsystem may further include a subsystem related paste located in a subsystem related enclosure configured to flow into the mixing chamber via a first channel connected to the first inlet, and a flowable medium configured to flow into the mixing chamber via a second channel connected to the second inlet. The mixing chamber is configured to mix the subsystem related paste and the flowable medium using the mixing element, thus, producing the subsystem related flowable product that may be output via the outlet.

Consistent with another disclosed embodiment, a method for dispensing a flowable product is provided. The method may include flowing a paste located in an enclosure via a first channel into a mixing chamber, the mixing chamber containing a mixing element capable of motion, and flowing a flowable medium via a second channel into the mixing chamber. The mixing chamber is configured to mix the paste and the flowable medium using the mixing element, thus, producing the flowable product that may be output via the outlet.

Consistent with other disclosed embodiments, memory device storing instructions may store program instructions, which are executed by at least one processor device and perform any of the methods described herein.

The foregoing general description and the following detailed description are exemplary and explanatory only and are not restrictive of the claims.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

An exemplary embodiment of a food or beverage product mixing and dispensing system 10 is illustrated in FIG. 1. System 10 may be configured to receive, store, and dispense a food or beverage material (e.g., a paste) for forming a food or beverage product. System 10 may include a material chamber 20, configured to store food or beverage material, such as a paste 22 for producing a beverage product 56. Although paste 22 is described herein and shown in the figures as an example of a food or beverage material that may be stored in chamber 20 for purposes of convenience, it is contemplated that other types of materials may be stored in and dispensed from material chamber 20. System 10 may also include a dispensing actuator 27 configured to cause paste 22 to be dispensed from material chamber 20 into other parts of the system 10. In some embodiments, system 10 may also include a static mixer 26 configured to cause material dispensed from chamber 20 to be at least partially mixed before the material is received by a mixing chamber 36.

In various embodiments, material chamber 20 may be configured to store food or beverage material. For example, material chamber 20 may be configured to store an ingredient or ingredient mixture (e.g., paste) for use in producing a food or beverage product. Material chamber 20 may be cylindrical, generally cylindrical, or otherwise include a hollow cavity within (i.e., formed by or defined by) an exterior container structure. Material chamber 20 may be sized and shaped to fit the particular size and geometric requirements for a system design. For example, material chamber 20 may include a rectangular, cylindrical, spherical, conical, tapered, or another exterior shape. The material chamber 20 may be a flexible pouch (herein referred to as pouch 20). Pouch 20 may be formed from any food grade material such as high-density polyethylene, polyethylene terephthalate, fluoropolymer and/or the like. Pouch 20 may be formed from a polymeric, plastic, paper, or metal foil material. In an example embodiment, flexible pouch 20 may be formed from an antifouling material or may include an antifouling coating (e.g., anti-sticking coatings).

In some embodiments, pouch 20 may be configured to be cooled to prevent or inhibit the separation of constituent components of the material in pouch 20 (e.g., of paste 22). Pouch 20 may be configured to receive or contact a cooling agent to cause contents of the chamber to be cooled. Cooling agents may include materials that may facilitate heat transfer to cause the material in pouch 20 to be cooled, such as air, water, a refrigerant, a gas, or a cooling substance (e.g., a cooled gas, liquid, or solid material). In some embodiments, pouch 20 may be combined with, connected to, or located in proximity to a cooling device or component. For example, pouch 20 may be surrounded by a component or container (e.g., a cooling jacket) configured to allow a cooling agent to surround and contact pouch 20 for cooling the contents of pouch 20. In some embodiments, space surrounding pouch 20 may be cooled (e.g., using a refrigeration system) to allow pouch 20 be positioned in a cooled environment for causing the contents of the chamber to be cooled.

Dispensing actuator 27 may be configured to dispense material, such as paste 22, from pouch 20 into other components of the system 10. In some embodiments dispensing actuator 27 may be a peristaltic pump (herein also referred to as peristaltic pump 27). The peristaltic pump may be configured to dispense or dose paste 22 from pouch 20 into mixing chamber 36 via a static mixer 26. Static mixer 26 may be configured to receive material exiting chamber 20 and to cause the material to be at least partially mixed by passing through the static mixer 26. For example, static mixer 26 may be generally tubular and may have any suitable shape (e.g., circular, rectangular, or other cross-section) or construction. Static mixer 26 may include stationary (i.e., "static") components, such as a plurality of surfaces, blades, fins, or other protrusions. The components of a static mixer may be arranged in a predetermined uniform pattern or may be positioned in a non-uniform or random arrangement. The arrangement of components of static mixer 26 may be designed to achieve at least some mixing (or an optimum mixing) or agitation of material exiting pouch 20. For example, the components of static mixer 26 may be designed or configured to cause separated constituents of material in pouch 20 to be remixed, infused, or otherwise combined (i.e., to reduce or reverse separation) during passage through static mixer 26. In some embodiments, static mixer 26 may include a screen, mesh, grate, foam, or other structured component configured to cause agitation or turbulence in the material passing through a static mixer. Static mixer 26 may achieve mixing of the constituents of material exiting pouch 20 without additional moving parts that could add cost and/or complexity to system 10. In some embodiments, system 10 may not include static mixer 26. In other embodiments, system 10 may include multiple static mixers (e.g., of the same or different types) at various locations along conduits 21A and 21B.

In various embodiments, system 10 may include a mixing chamber 36 configured to receive material from pouch 20 (e.g., via a conduit 21B, as shown in FIG. 1, and/or static mixer 26) and/or from other sources. Mixing chamber 36 may have any suitable shape, such as a cylindrical, spherical, rectangular, or another shape. Mixing chamber 36 may be formed of any suitable material, such as metal, plastic, glass, and/or another type of material. In some embodiments, mixing chamber 36 may include an opening 38 (e.g., a first opening) for receiving material from pouch 20 and an outlet 40 for dispensing material (e.g., a food or beverage product) from mixing chamber 36. In some embodiments, mixing chamber 36 may be cooled. For example, mixing chamber 36 may be surrounded by a component or container (e.g., a cooling jacket) configured to allow a cooling agent to surround and contact mixing chamber 36 for cooling the contents the mixing chamber. In some embodiments, space surrounding mixing chamber 36 may be cooled (e.g., using a refrigeration system) to allow the mixing chamber to be positioned in a cooled environment for causing the contents of the chamber to be cooled.

In various embodiments, conduit 21B may be connected to mixing chamber 36 via a connector 15 that may be connected to an opening 38. Connector 15 may include a valve and be configured to only allow flow from pouch 20 to mixing chamber 36. For example, connector 15 may include a check valve or a poppet valve and/or the like. Similarly, conduit 21A may be connected to pouch 20 via a valve 41 that may also allow flow from pouch 20 to mixing chamber 36 and may prevent from mixing chamber 36 towards pouch 20. In an example embodiment, valve 41 may be a check valve or a poppet valve and/or the like.

Mixing chamber 36 may also include a mixing tool 42 driven by a mixing actuator 44. Mixing tool may be configured to mix food or beverage materials within mixing chamber 36. Mixing tool 42 may be shaped to promote mixing of materials within mixing chamber 36. For example, mixing tool 42 may include bars, hooks, blades, paddles, whisks, beaters, spatulas, and/or other shapes, tools, or devices. It is contemplated that mixing tool 42 may include one or more shapes, tools, or devices (i.e., it may include a single shape, tool, or device or multiple shapes, tools, or devices). In some embodiments, mixing tool 42 may also or alternatively include one or more components configured to scrape or wipe interior portions of mixing chamber 36. For example, mixing tool 42 may include one or more paddles, extensions, wipers, etc., configured to contact interior portions of mixing chamber 36 to collect, dislodge, or wipe material thereon.

Mixing actuator 44 may be or include a motor. The motor of mixing actuator 44 may be or include an electric motor, such as a direct current (DC) motor or servomotor. It is contemplated that the motor of mixing actuator 44 may alternatively be or include an alternating current (AC) electric motor. In some embodiments, amount of force and/or the speed at which mixing tool 42 is rotated may partially define the requirements (and thus the design) of the motor of mixing actuator 44 and/or the suitability of various types of commercially available motors that may be used. For example, in some instances, the motor of mixing actuator 44 may only be required to achieve a single speed or power level. In other embodiments, the motor of mixing actuator 44 may be required to achieve multiple speeds. The motor of mixing actuator 44 may be an electric motor or a different type of motor, such as a pneumatically driven or hydraulically driven motor. It is to be appreciated that similar considerations of speed and power requirements of the motor of mixing actuator 44 may be addressed for pneumatic or hydraulic motors by considering motor parameters, such as pressure, displacement, rotational speed, rotational direction, time-dependent rotational speed (e.g., pulsed operation), as well as application considerations (e.g., size, cost, complexity, serviceability, maintenance, sanitation, etc.). The motor of mixing actuator 44 may be equipped with a suitable power source, such as an electrical power source (e.g., a battery, a capacitor, a power supply, a direct connection to utility power, etc.), a pneumatic power source (e.g., a compressor, a tank, an accumulator, etc.), a hydraulic power source (e.g., a pump, a tank, an accumulator, etc.), and associated electrical or mechanical conduit.

Mixing chamber 36 may include one or more additional openings having valves configured to receive materials or process aids from one or more input sources (e.g., water source). For example, mixing chamber 36 may include a second opening for conduit 13 configured to receive water from a water source. Conduit 13 may be connected to mixing chamber 36 via valve 17. In various embodiments, valve 17 may be configured to only allow flow from the water source to mixing chamber 36. For example, valve 17 may be a check valve or a poppet valve and/or the like. It should be noted that water is only one illustrative flowable medium, and other flowable materials may flow via conduit 13. In an example embodiment, such flowable materials may include any suitable water-based or oil-based food products.

In various embodiments, mixing chamber 36 may include a pressure sensor 80 associated with (e.g., connected to, disposed within, etc.) mixing chamber 36 and configured to generate a pressure measurement signal based on the amount of product present in chamber 36. Additionally, or alternatively, mixing chamber 36 may have a weight sensor 37, as shown in FIG. 1. Weight sensor 37 may be configured to measure the weight of mixing chamber 36 when a beverage product is present in mixing chamber 36. In some embodiments, weight sensor 37 may be used to measure a ratio of paste 22 to water. In an example embodiment, water may be flowed first to mixing chamber 36, and weight sensor may be configured to measure the weight of the water without the presence of paste 22. Following the flow of the water into a mixing chamber, paste 22 may be introduced, and the weight of water and paste 22 may be measured again to deduce the weight of paste 22. In various embodiments, paste 22 may be introduced in small amounts, and the weight of paste 22 may be measured recurrently to obtain the correct paste-to-water weight ratio. In some embodiments, paste 22 may be introduced into a weight/volume measuring container prior to mixing paste 22 and water in mixing chamber 36.

Figure 2:
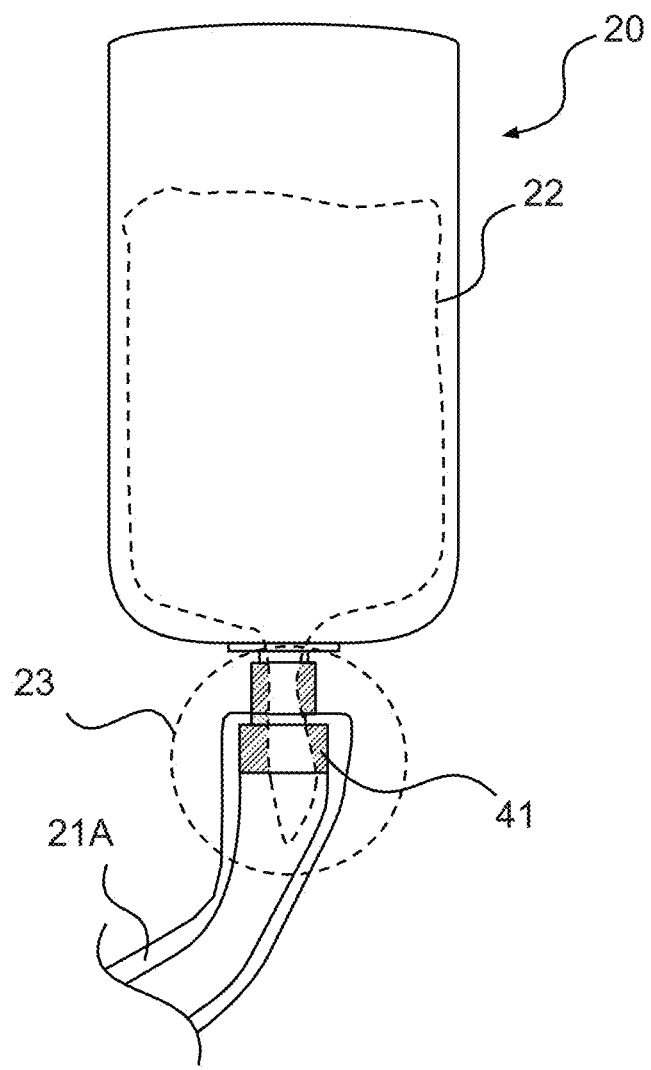
FIG. 2 is a schematic illustration of an exemplary pouch, consistent with embodiments of this disclosure.

An exemplary embodiment of a pouch 20 used for system 10, is illustrated in FIG. 2. Pouch 20 may have an outlet valve 41 that may be a food grade unidirectional silicone valve designed to release paste 22 from pouch 20 when a pressure difference is applied across the valve, with pressure being lower outside pouch 20. In various embodiments, valve 41 may include a head unit for a tight connection to conduit 21A (e.g., tight connection in region 23). In an example embodiment, the head unit may include a sanitary nipple. In an example embodiment, conduit 21A may be directly connected to the head unit (e.g., sanitary nipple). Alternatively, or additionally, conduit 21A may be connected to a manifold that may be connected to the head unit. In an example embodiment, conduit 21A may be connected to the head unit using any suitable solution such as "push-to-connect" connection that may involve pushing an end of conduit 21A over the head unit. Alternatively, conduit 21A may include a screw fitting that may connect with the head unit via a screwing action.

Figure 3:
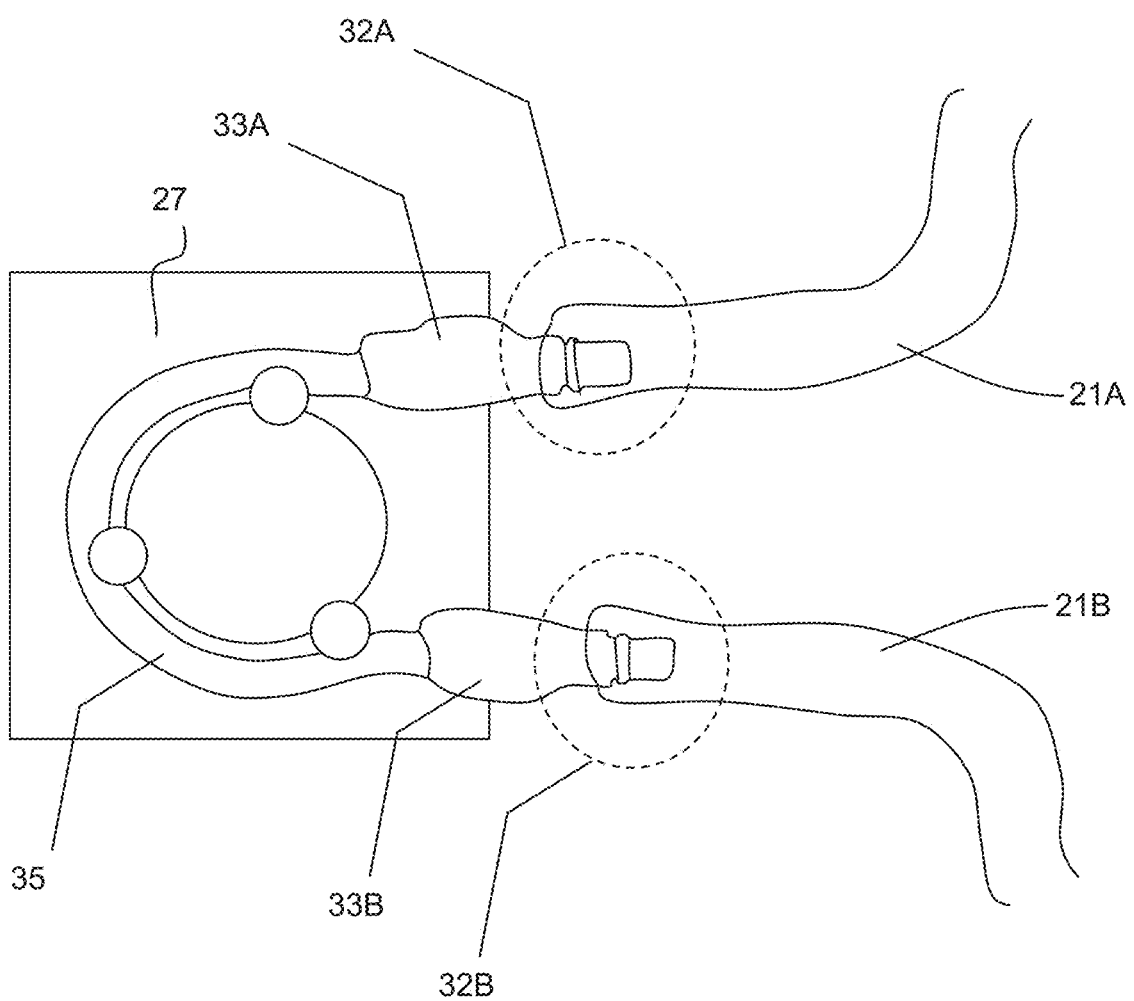
FIG. 3 is a schematic illustration of a peristaltic pump for pumping a dairy-free base paste, consistent with embodiments of this disclosure.

Conduit 21A may be connected to a peristaltic pump 27 as shown in FIGS. 1 and 3. In an example embodiment, peristaltic pump 27 may include a flexible conduit 35 that may be connected to conduits 21A and 21B via connections 32A and 32B respectively. In an example embodiment, flexible conduit 35 may include head units 33A and 33B for a tight connection to conduits 21A and 21B respectively and units 33A and 33B may be sanitary nipples. Similar to the connection between pouch 20 and conduit 21A, connections 32A and 32B may be any suitable tight connections, such as "push-to-connect" connection, or connection using screw fittings. It should be noted, that the peristaltic pump described above is only illustrative, and any other suitable pump may be used. For example, a piston pump, a rotary pump, and the like may be used.

In various embodiments, water (or any other suitable flowable food product) may be first delivered to mixing chamber 36 via conduit 13 followed by dispensing a predetermined amount of paste 22 via connector 15. In an example embodiment, the amount of water delivered to mixing chamber 36 may depend on the amount of beverage product 56 requested. For example, system 10 may include an input device for a customer to select the amount of product 56 to dispense, or system 10 may determine the amount of product 56 to dispense based on the size of predetermined containers supplied for system 10. In various embodiments, the amount of paste 22 dispensed into mixing chamber 36 is determined by the amount of water delivered to mixing chamber 36. In various embodiments, paste 22 may be added to mixing chamber 36 as chamber 36 is engaged in mixing beverage product 56. In some embodiments, mixing chamber 36 may initiate mixing prior to addition of paste 22, in order to set up a mixing flow within chamber 36. In some embodiments, the predetermined amount of paste 22 may be delivered to mixing chamber 36 in incremental amounts.

Mixing chamber 36 may be periodically cleaned to maintain required sanitary condition within the enclosure of chamber 36. In an example embodiment, mixing chamber 36 may be cleaned depending on an interval of time since the last use of system 10. For example, chamber 36 may be rinsed with water every ten minutes when system 10 is inactive (i.e., is not engaged in dispensing beverage product 56). In an example embodiment, hot water with water temperatures above 100° F. may be used. It should be noted, that interval of time of ten minutes is only illustrative and any other appropriate interval time of inactivity may be selected as a duration of time after which system 10 may need to be rinsed. In some cases, system 10 may be rinsed for a selected duration of time that may depend on a variety of factors such as the frequency of use of system 10, the type of paste 22 used for preparing beverage product 56, the temperature of the mixing chamber 36, ambient humidity, and the like.

Figure 4:
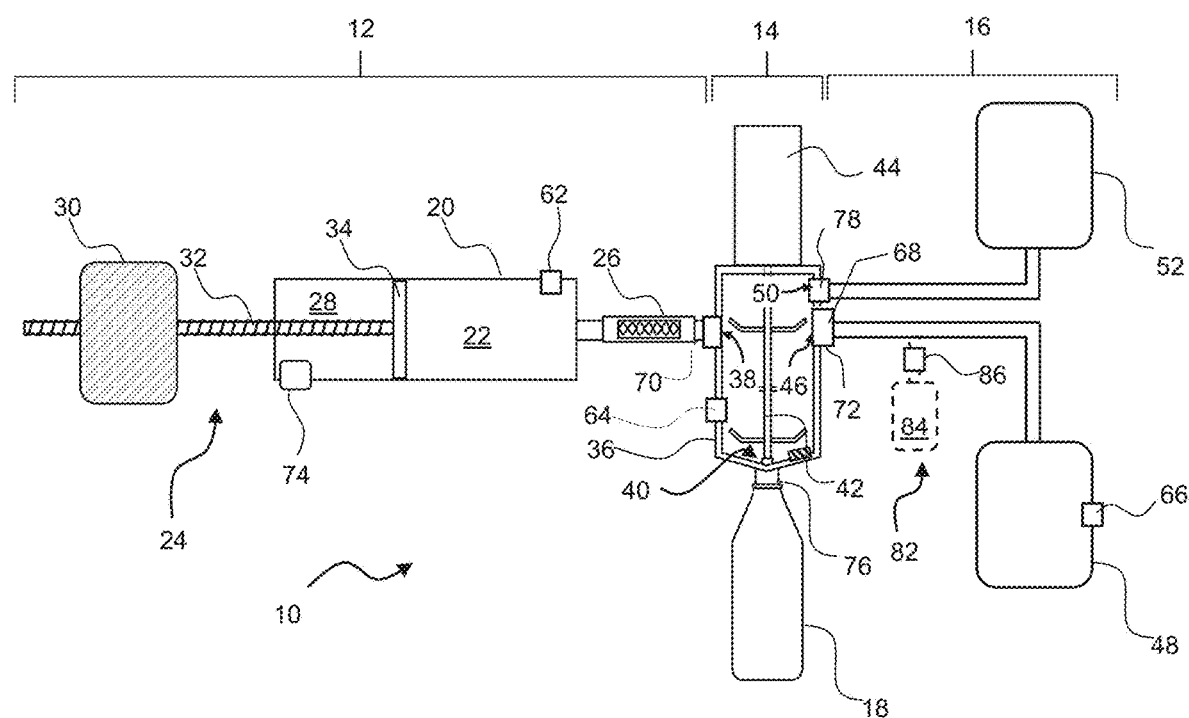
FIG. 4 is a schematic illustration of a mixing chamber, consistent with embodiments of this disclosure.

Another exemplary embodiment of a food or beverage product mixing and dispensing system 10 is illustrated in FIG. 4. The system 10 may include a material dispensing system 12 and a mixing system 14. The material dispensing system 12 may be configured to receive, store, and dispense a food or beverage material (e.g., a paste) for use in forming a food or beverage product. The mixing system 14 may be configured to receive dispensed material from the dispensing system 12 and one or more other input sources 16 (e.g., food or beverage ingredient sources, process aid sources, etc.). The mixing system 14 may also be configured to mix a plurality of materials (e.g., ingredients), store materials, and dispense materials. For example, mixing system 14 may be configured to receive dispensed material from dispensing system 12, mix the dispensed material with other ingredients to form a food or beverage product, and dispense the food or beverage product into a container 18.

Material dispensing system 12 may include a material chamber 20 configured to store food or beverage material, such as paste 22. Although paste 22 is described herein and shown in the figures as an example of a food or beverage material that may be stored in chamber 20 for purposes of convenience, it is contemplated that other types of materials may be stored in and dispensed from chamber 20. Material dispensing system 12 may also include a dispensing actuator 24 configured to cause the material (e.g., paste 22) to be dispensed from material chamber 20 into other parts of the system 10. In some embodiments, material dispensing system 12 may also include a static mixer 26 configured to cause material dispensed from chamber 20 to be at least partially mixed before the material is received by mixing system 14.

Material chamber 20 may be configured to store a suitable food product for preparation a plant-based beverage as described above in connection with FIG. 1. In an example embodiment, as shown in FIG. 4, material chamber may be cylindrical and may include a hollow cavity 28 within (i.e., formed by or defined by) an exterior container structure. The hollow cavity 28 of material chamber 20 (or a portion thereof) may include a rectangular, cylindrical, spherical, conical, tapered, or another shape. The volume of cavity 28 may be sized to contain a desired amount of material, which may be selected based on one or more considerations, such as a number of food or beverage product servings to be produced, size constraints of system 10, the perishable nature of material stored in the material chamber 20, force and power considerations for dispensing material from the chamber 20, the type and/or geometry of dispensing actuator 24 and/or components thereof, and/or other considerations.

Material chamber 20 may be directly filled with material, such as, for example, paste 22, by adding material into cavity 28 via an opening in material chamber 20. That is, the material may be injected, poured, or otherwise applied to fill the chamber 20 or a portion thereof. In other embodiments, the material, such as paste 22, may be prepackaged, and chamber 20 may be configured to receive a replaceable prepackaged unit of material. For example, material, such as paste 22, may be prepackaged in a polymeric, plastic, paper, glass, or metal container, and chamber 20 may be configured to receive replaceable containers through an opening designed to accommodate such packaging. For example, in some embodiments, the material, such as paste 22, may be prepackaged in a rectangular, cylindrical, spherical, conical, tapered, or other shaped bag or other rigid, semi-rigid, flexible, or another container. The material, such as paste 22, may be prepackaged in a disposable or reusable cartridge, container, or another unit, and chamber 20 may be configured to receive the prepackaged material and permit for the prepackaged material container to be removed or replaced.

The shape, size, capacity, and construction of chamber 20 and/or the prepackaging container of material stored in chamber 20 may be specifically designed to accommodate particular design requirements (e.g., design choices relevant to a particular application) or may be selected from commercially available products or offerings. Material chamber 20 and/or the prepackaging container of material stored in chamber 20 may be constructed of suitable materials, such as metal, plastic, glass, paper, cardboard, or another type of material. The suitability of a material may depend upon, among other considerations, cost, weight, durability, government agency regulations, sanitation, disposability, reusability, force and power considerations related to dispensing material, and/or the type or design of dispensing actuator 24 or components thereof.

To improve the quality of food or beverage products mixed and dispensed using system 10, chamber 20 may be configured to prevent, reverse, or reduce the effects of possible separation of constituent components of material inside chamber 20 (e.g., of paste 22). For example, in some embodiments, material chamber 20 may be oriented horizontally. As shown in FIG. 4, material chamber 20 may be configured horizontally such that the material inside chamber 20, i.e., paste 22, is dispensed in a horizontal direction. For example, material chamber 20 may be configured to allow dispensing actuator 24 to force material out of chamber 20 in a horizontal direction. By orienting chamber 20 in a horizontal direction and allowing dispensing actuator 24 to dispense material from chamber 20 in a horizontal direction, separated materials within chamber 20 may be dispensed simultaneously and proportionally from chamber 20 for use in forming a food or beverage product. For instance, when material separation occurs, the effects of gravity may cause a first separated constituent to rise in a vertical direction above at least another separated constituent, thereby causing a plurality of layers to be formed along a vertical direction. To ensure a proportional amount of each separated constituent is dispensed when dispensing actuator 24 forces material from chamber 20, chamber 20 and dispensing actuator 24 may be oriented horizontally to allow dispensing actuator 24 for force material from chamber 20 in a horizontal direction. Whereas dispensing material in a vertical direction would allow only the bottommost separated constituent to be entirely dispensed before other constituents can be dispensed, the horizontal orientation of chamber 20 and dispensing actuator 24 may allow a proportional quantity of each separated constituent to be dispensed each time. Thus, even if material separation occurs, a predetermined amount of material (e.g., paste 22) having a desired concentration of each constituent component may be distributed.

As used herein with respect to the orientation of material chamber 20 and dispensing actuator 24 for purposes of reducing the effects of material separation, the term "horizontal" may be understood to mean horizontal—i.e., parallel to, in the plane of, or operating in a plane parallel to the horizon or to a baseline). It is contemplated that the term "horizontal" may also include deviations or differences from horizontal such that the effect of allowing proportional amounts of separated constituents to be dispensed from chamber 20 may be achieved. For example, the term "horizontal" may be understood to mean generally horizontal, approximately horizontal, or at least approximately horizontal or at least generally horizontal. It is also contemplated that the horizontal orientation of chamber 20 and dispensing actuator 24 may deviate from horizontal and that any deviation or difference from horizontal may be determined empirically through testing.

In some embodiments, as discussed before, chamber 20 may be configured to be cooled to prevent or inhibit the separation of constituent components of the material in chamber 20 (e.g., of paste 22). It is contemplated that cooling chamber 20 may prevent or inhibit the separation of constituent components of material inside chamber 20, and thus other ways of cooling chamber 20 and/or its contents may be used.

In some embodiments, chamber 20 may be configured to rotate to prevent, inhibit, or reverse the separation of constituent components of the material within chamber 20 (e.g., of paste 22). Chamber 20 may be configured to be rotated by a rotating actuator (e.g., a motor) to cause the contents of chamber 20 to be rotated before, during, or after being dispensed, including during storage periods. The rotating actuator may be configured to rotate chamber 20 at various speeds, which may be manually or automatically selected, or at a predetermined speed. The rotating actuator may be connected to chamber 20 via any suitable connection, such as a one or more shafts, couplings, gears, belts, pulleys, and/or other components. Chamber 20 may be configured to rotate about an axis oriented horizontally (e.g., as the term "horizontal" was used above with respect to the orientation of chamber 20), vertically, or between horizontally and vertically. Rotating chamber 20 may inhibit, prevent, or reverse the separation of constituent components of material within chamber 20 (e.g., paste 22) by stirring, mixing, agitating, or otherwise applying force to the contents of chamber 20. Chamber 20 may be rotated constantly, periodically, on demand, or otherwise for purposes of inhibiting, preventing, or reversing the separation of its contents.

Dispensing actuator 24 may be configured to dispense material, such as paste 22, from the material chamber 20 into other components of system 10. Dispensing actuator 24 may include a motor 30, an actuating member 32, and an implement 34. Motor 30 may be or include an electric motor, such as a direct current (DC) motor or servomotor. It is contemplated that motor 30 may alternatively be or include an alternating current (AC) electric motor. In some embodiments, the desired precision of dispensed quantities of material from chamber 20 may partially define the requirements (and thus the design) of motor 30 and/or the suitability of various types of commercially available electric motors that may be used. For example, in some instances, relatively precise or fine control of motor 30 may be required to enable relatively precise dispensing or "dosing" of material from chamber 20. Motor 30 may be selected to provide sufficient control for achieving the desired dispensing or dosing precision. Motor 30 may be a different type of motor, such as a pneumatically driven or hydraulically driven motor.

It is to be appreciated that similar considerations of dispensing or dosing precision may be addressed for pneumatic or hydraulic motors by considering motor parameters, such as pressure, displacement, rotational speed, rotational direction, as well as application considerations (e.g., size, cost, complexity, serviceability, maintenance, sanitation, etc.). It is to be appreciated that motor 30 may be equipped with a suitable power source, such as an electrical power source (e.g., a battery, a capacitor, a power supply, a direct connection to utility power, etc.), a pneumatic power source (e.g., a compressor, a tank, an accumulator, etc.), a hydraulic power source (e.g., a pump, a tank, an accumulator, etc.), and associated electrical or mechanical conduit.

Actuating member 32 may be configured to transfer power from or be driven by motor 30 for dispensing or dosing material from chamber 20. For example, actuating member 32 may be a screw-type member, such as a worm gear, screw gear, auger, or another type of device configured to transfer power through rotational motion. For example, actuating member 32 may be threaded and configured to move translationally (e.g., parallel to its rotational axis) as it rotates within a stationary threaded device to cause implement 34 to move and force material out of chamber 20. In other embodiments, actuating member 32 may be threaded and configured to rotate without translational motion to cause implement 34 to translate via forces applied through corresponding threaded features associated with implement 34. In other embodiments, actuating member 32 may be or include other components, such as levers, gears, pulleys, belts, chains, or combinations thereof. It is to be appreciated that actuating member 32 is configured to transfer power from motor 30 to material within chamber 20 in order to cause material within the chamber 20 to be forced out of chamber 20 as desired, and thus actuating member 32 may be designed a number of different ways to achieve this functionality.

Implement 34 may be configured to contact the material (or material container) stored within chamber 20 and to force material out of chamber 20. Implement 34 may be connected to or otherwise configured to be driven by actuating member 32 and/or motor 30. Implement 34 may be shaped to apply force or pressure to the material within chamber 20 and/or its container. For example, implement 34 may be shaped to match a shape of cavity 28 or to ensure that material is forced out of chamber 20 (i.e., instead of only being forced to another portion of cavity 28). For example, implement 34 may be shaped to match the contours or perimeter of at least a cross-sectional portion of cavity 28, and may be configured to contact (e.g., to make sealing contact with) an inner surface of cavity 28. In some embodiments, implement 34 may be a piston having a side that is flat, convex, concave, conical, hemispherical, or another shape. In some embodiments, implement 34 may be permanently or semi-permanently connected to actuating member 32 or motor 30 (i.e., it may be a component of dispensing actuator 24). In other embodiments, implement 34 may be a component of the packaging (e.g., prepackaging) of material stored within chamber 20. For example, implement 34 may be a plunger or similar device included or installed within a replaceable material cartridge configured to be contacted or otherwise be driven by actuating member 32 or motor 30 during a dispensing or dosing process.

In other embodiments, dispensing actuator 24 may be a different type of devices, such as a linear pneumatic or hydraulic actuator. For example, dispensing actuator 24 may be a piston-cylinder actuator driven by pneumatic or hydraulic power.

Alternatively, dispensing actuator 24 may be configured to pressurize cavity 28 to cause the material in chamber 20 to be forced out of the chamber 20. For example, dispensing actuator may be configured to pressurize the material chamber 20 with air (or another suitable gas, such as nitrogen, carbon dioxide, etc.) to cause the material to be forced out of chamber 20. In such an embodiment, dispensing actuator 24 may include a source of pressurized gas, such as a pump and/or storage tank connected to material chamber 20 via a suitable conduit and one or more controllable valves for supplying gas to chamber 20 for controlling the pressure in and dispensing of the material from the chamber 20. In such an embodiment, implement 34 may or may not be used. That is, in some embodiments, the pressure within chamber 20 may be controlled to cause the material to be forced out of chamber 20, whereas in other embodiments the pressure may act on implement 34 to cause the material to be forced from chamber 20.

Static mixer 26 may be configured to receive material exiting chamber 20 and to cause the material to be at least partially mixed as discussed above in connection with FIG. 1. In some embodiments, system 10 may not include static mixer 26. In other embodiments, system 10 may include multiple static mixers (e.g., of the same or different types) at various locations between chamber to and mixing system 14.

Mixing system 14 may include a mixing chamber 36, as described above, configured to receive material from chamber 20 (e.g., via a conduit and/or static mixer 26) and/or from other sources. In various embodiments, chamber 36 may include a mixing tool 42 as described above. It is contemplated that mixing tool 42 may include one or more shapes, tools, or devices (i.e., it may include a single shape, tool, or device or multiple shapes, tools, or devices). In some embodiments, mixing tool 42 may be configured to draw material into mixing chamber 36. For example, mixing tool 42 may be configured (e.g., shaped) to pass over or across opening 38 to create suction (e.g., negative pressure) near opening 38 or to knock or pull material near opening 38 in order to cause the material to be drawn or pulled into mixing chamber 36. For example, mixing tool (or a portion thereof) may be shaped with a convex, concave, cantilever, or extending portion configured to create suction or contact material near opening 38 to cause the material to be drawn or pulled into mixing chamber 36. In some embodiments, mixing tool 42 may also or alternatively include one or more components configured to scrape or wipe interior portions of mixing chamber 36. For example, mixing tool 42 may include one or more paddles, extensions, wipers, etc., configured to contact interior portions of mixing chamber 36 to collect, dislodge, or wipe material thereon. In various embodiments, mixing tool 42 may be operated by a mixing actuator 44 that, as described above, may be or include a motor.

Mixing chamber 36 may include one or more additional openings configured to receive materials or process aids from one or more of input sources 16. For example, mixing chamber 36 may include an opening 46 (e.g., a second opening) configured to receive water from a water source 48. Opening 46 may be fluidly coupled to water source 48 via a suitable conduit. Water source 48 may include a water storage device (e.g., a tank) and may be fluidly connected to a utility water supply. In some embodiments, water source 48 may include a filtration device to filter materials, contaminants, particles, etc., from water prior to the water being admitted into mixing chamber 36 (e.g., the filtration device may be positioned upstream or downstream of the water storage device when a water storage device is included).

In some embodiments, the water storage device (when included) may be cooled. For example, the water storage device may be surrounded by a component or container (e.g., a cooling jacket) configured to allow a cooling agent to surround and contact the water storage device for cooling the contents of the water storage device. In some embodiments, space surrounding the water storage device may be cooled (e.g., using a refrigeration system) to allow the water storage device to be positioned in a cooled environment for causing the contents of the water storage device to be cooled. It is contemplated that cooling the water storage device may be configured to maintain supply water at or near a predetermined temperature for preserving food or beverage ingredients and/or dispensing a mixed food or beverage product at a desirable temperature for consumption and/or storage after being dispensed from mixing chamber 36. For example, supply water contained within the water storage device may be maintained at a temperature in the range of 33-48 degrees Fahrenheit. It is contemplated that the temperature of the water supply may affect the storage temperature of the water in the water storage device and that temperature outside of 33-48 degrees Fahrenheit may be maintained.

Mixing chamber 36 may include an opening 50 (e.g., a third opening) configured to provide a process aid for improving the production of a food or beverage product within mixing chamber 36. For example, opening 50 may be fluidly connected a low-pressure source 52 configured to create suction (e.g., to create a vacuum) for affecting the pressure within mixing chamber 36 during the mixing process. For instance, during the mixing process, agitation of materials (e.g., paste 22, water, and/or other ingredients) within mixing chamber 36 may cause foam to develop. To reduce or prevent the formation of foam, mixing chamber 36 may be connected to a low-pressure source 52 via opening 50. Exposing mixing chamber 36 to low-pressure source 52 during the mixing process may reduce or prevent the formation of foam, thereby reducing or preventing foam from being dispensed into container 18. Opening 50 may be connected to low-pressure source 52 via a suitable conduit. Low-pressure source 52 may include a pump driven by a power source (e.g., a motor).

As described above, mixing chamber 36 may include outlet 40 (e.g., a fourth opening) configured to allow material to exit mixing chamber 36 into container 18. Outlet 40 may be positioned near a bottom portion of mixing chamber 36 to allow material to exit mixing chamber 36 with the assistance of gravity. It is contemplated that outlet 40 may be located at other portions of mixing chamber 36 and may be connected to a pumping device for pumping material out of mixing chamber 36 through outlet 40 into container 18. Container 18 may be any suitable container configured to receive and contain a food or beverage product. Container 18 may be formed of any suitable material, such as plastic, metal, glass, etc. Container 18 may be of a predetermined size, shape, and/or volume. Alternatively, container 18 may be supplied by a customer and may, therefore, be any suitable size, shape, or volume.

It is contemplated that mixing chamber 36 may include one or more additional openings for admitting one or more other ingredients into mixing chamber 36. For example, it is contemplated that system 10 may include additional sources of materials that may be added to mixing chamber 36 for affecting the nature of food or beverage products mixed and dispensed from mixing chamber 36. For example, it is contemplated that system 10 may include sources of ingredients, such as spices, sweeteners, flavorings, colorings, and/or additional ingredients, and each ingredient may be added to mixing chamber 36 via separate or common dosing equipment (e.g., dosing actuators, conduit, valves, etc.).

Such additional ingredients may each be associated with (e.g., connected to) separate dosing equipment and openings that may be controlled in accordance with the descriptions and methods disclosed herein for adding such additional ingredients into mixing chamber 36.

System 10 may include an electronic control unit 94 (ECU) operably coupled to (e.g., electrically and/or electronically connectable to) one or more components of system 10. Electronic control unit 94 may include one or more components, for example, a memory device 96 and at least one processor device 98. Memory device 96 may be or include non-transitory computer readable medium and may include one or more memory units of non-transitory computer-readable medium. Non-transitory computer-readable medium of memory device 96 may be or include any type of disk including floppy disks, optical discs, DVD, CD-ROMs, Microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing computer-readable instructions and/or data. Memory units may include permanent and/or removable portions of non-transitory computer-readable medium (e.g., removable media or external storage, such as an SD card, RAM, etc.).

Non-transitory computer-readable medium associated with memory device 96 may also be configured to store logic, code and/or program instructions executable by processor device 98 to perform any suitable embodiment of the methods described herein. For example, non-transitory computer-readable medium associated with memory device 96 may be configured to store computer-readable instructions that, when executed by processor device 98, cause the processor to perform a method comprising one or more steps. In some embodiments, the computer-readable instructions may be stored in or as one or more modules associated with one or more methods or processes. The methods performed by processor device 98 based on the instructions stored in the non-transitory computer readable medium may involve processing inputs, such as inputs of data or information stored in the non-transitory computer-readable medium of memory device 96, inputs received from input device, inputs received from sensory components (e.g., received directly from one or more sensors or retrieved from memory), and/or other inputs. The non-transitory computer-readable medium may be configured to store data sensed by one or more sensors for processing by processor device 98. In some embodiments, the non-transitory computer-readable medium can be used to store processing results produced by processor device 98.

Processor device 98 may include one or more processors (e.g., microprocessors) and may be or include a programmable processor (e.g., a central processing unit (CPU)). Processor device 98 may be operatively coupled to memory device 96 or another memory device configured to store programs or instructions executable by processor device 98 for performing one or more method steps. It is noted that method steps described herein may be stored in memory device 96 and may be carried out by processor device 98 to cause the method steps to be performed.

Figure 5:
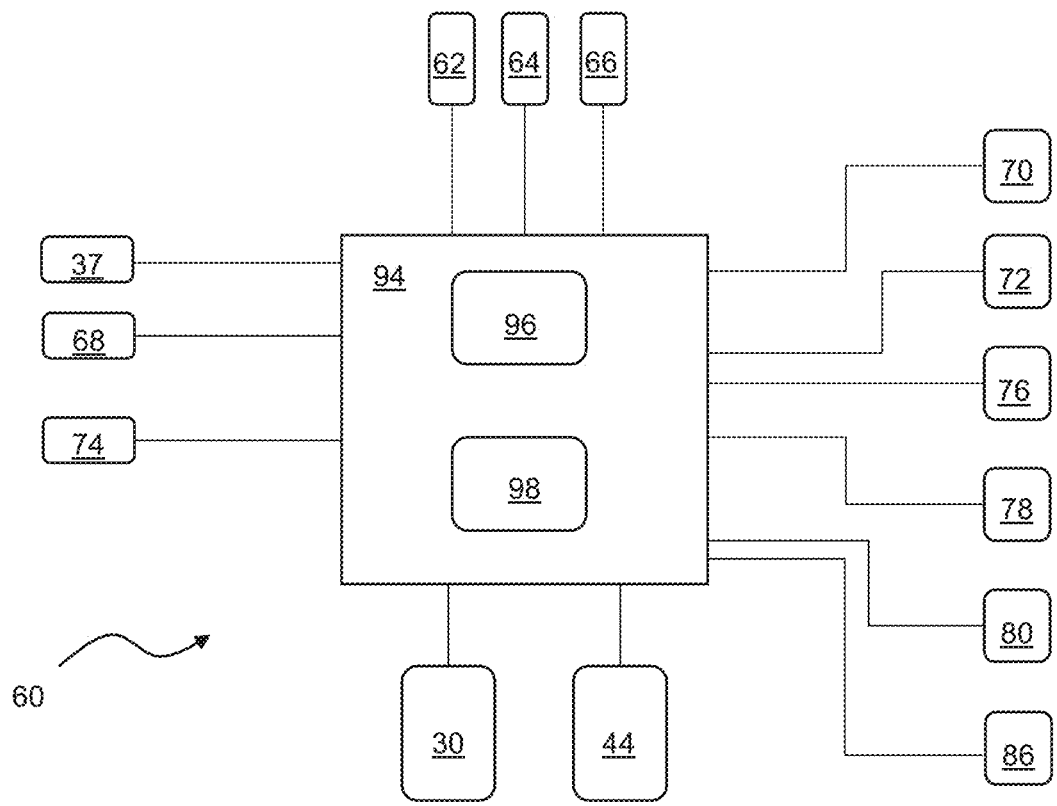
FIG. 5 is a schematic illustration of an exemplary disclosed control system, consistent with embodiments of this disclosure.

With reference to FIGS. 4 and 5, in some embodiments, electronic control unit 94 may be part of a control system 60. Control system 60 may be configured to monitor and/or control one or more components of system 10. For example, control system 60 may include one or more temperature sensors configured to detect the temperature of one or more components or spaces within system 10. For example, control system 60 may include a temperature sensor 62 (e.g., a first temperature sensor) associated with (e.g., connected to, in contact with, disposed on or within, etc.) material chamber 20 and configured to sense or detect the temperature of material (e.g., paste 22) within material chamber 20.

Temperature sensor 62 may be electrically and/or electronically connected to electronic control unit 94. Electronic control unit 94 may be configured to receive a temperature measurement signal from temperature sensor 62 and control the temperature of the material within chamber 20 based on the temperature measurement signal from temperature sensor 62. For example, electronic control unit 94 may be electrically and/or electronically connected to a cooling device associated with (e.g., connected to, in contact with, included within, etc.) material chamber 20 and configured to control an aspect of the cooling device to affect and control the temperature of material within the chamber 20. For instance, electronic control unit 94 may be configured (e.g., programmed with computer-readable instructions, connected to memory storing computer-readable instructions executable by electronic control unit 94, etc.) to control, for example, a valve, a power source, a motor, a pump, an electronic element, a fan, or other component of the cooling device in order to change or maintain the temperature of material within chamber 20. In this way, separation of constituent elements of material (e.g., paste 22) within chamber 20 may be inhibited or prevented.

Control system 60 may include a temperature sensor 64 (e.g., a second temperature sensor) associated with (e.g., connected to, in contact with, disposed on or within, etc.) mixing chamber 36 and configured to sense or detect the temperature of material (e.g., paste 22, water, other ingredients, and combinations thereof) within material mixing chamber 36. Temperature sensor 64 may be electrically or electronically connected to electronic control unit 94. Electronic control unit 94 may be configured to receive a temperature measurement signal from temperature sensor 64 and control the temperature of the material within mixing chamber 36 based on the temperature measurement signal from temperature sensor 64. For example, electronic control unit 94 may be electrically or electronically connected to a cooling device associated with (e.g., connected to, in contact with, included within, etc.) mixing chamber 36 and configured to control an aspect of the cooling device to affect and control the temperature of material within the mixing chamber 36. For instance, electronic control unit 94 may be configured (e.g., programmed with computer-readable instructions, connected to memory storing computer-readable instructions executable by electronic control unit 94, etc.) to control, for example, a valve, a power source, a motor, a pump, an electronic element, a fan, or other component of the cooling device in order to change or maintain the temperature of material within mixing chamber 36. In this way, the material contained within and dispensed from mixing chamber 36 may be brought to or maintained at a suitable temperature for preserving food or beverage ingredients and/or for consuming products dispensed from mixing chamber 36.

Control system 60 may include a temperature sensor 66 (e.g., a third temperature sensor) associated with (e.g., connected to, in contact with, disposed on or within, etc.) water source 48 and configured to sense or detect the temperature of water within or drawn from water source 48. Temperature sensor 66 may be electrically or electronically connected to electronic control unit 94. Electronic control unit 94 may be configured to receive a temperature measurement signal from temperature sensor 66 and control the temperature of water within or drawn from water source 48 based on the temperature measurement signal from temperature sensor 66. For example, electronic control unit 94 may be electrically or electronically connected to a cooling device associated with (e.g., connected to, in contact with, included within, etc.) water source 48 and configured to control an aspect of the cooling device to affect and control the temperature of water within or drawn from the water source 48. For instance, electronic control unit 94 may be configured (e.g., programmed with computer-readable instructions, connected to memory storing computer-readable instructions executable by electronic control unit 94, etc.) to control, for example, a valve, a power source, a motor, a pump, an electronic element, a fan, or other component of the cooling device in order to change or maintain the temperature of water within or drawn from water source 48. In this way, material mixed with water from water source 48 may be brought to or maintained at a suitable temperature for preserving food or beverage ingredients and/or for consuming products dispensed from mixing chamber 36.

Control system 60 may use weight sensor 37, as shown in FIG. 1 associated with (e.g., connected to, in contact with, disposed on or within, etc.) mixing chamber 36 and configured to sense or detect the weight of the material (e.g., water, paste 22, other ingredients, combinations thereof, etc.) within mixing chamber 36. Weigh sensor 37 may be electrically or electronically connected to electronic control unit 94. Electronic control unit 94 may be configured to receive a weight measurement signal from weight sensor 37 and control the weight of material within mixing chamber 36 based on the weight measurement signal from sensor 37. For example, electronic control unit 94 may be electrically or electronically connected to a valve 70 (e.g., a first valve) configured to control the passage of material from chamber 20 to mixing chamber 36, a valve 72 (e.g., a second valve) configured to control the passage of water from water source 48 to mixing chamber 36, and/or dispensing actuator 24 and configured to control the material weight within mixing chamber 36. For instance, electronic control unit 94 may be configured (e.g., programmed with computer-readable instructions, connected to memory storing computer-readable instructions executable by electronic control unit 94, etc.) to control, for example, a valve (e.g., valve 70 for adding material from chamber 20, valve 72 for adding water, etc.), an actuator (e.g., dispensing actuator 24 for adding material from chamber 20), a motor, a pump, an electronic element, or other component of system 10 in order to change or maintain the weight of material within mixing chamber 36. In this way, the dosing (i.e., addition) of material (e.g., paste 22, water, etc.) into mixing chamber 36 may be controlled according to predetermined recipe specifications and/or to prevent overfilling of mixing chamber 36. In some embodiments, multiple weight sensors may be included in order to detect changes in the material weight within mixing chamber 36, for example, to measure and/or control the dosing of multiple ingredients (e.g., paste 22, water, and/or other ingredients) based on the detected material weight or change in material weight.

Control system 60 may include a level sensor 68 (e.g., a first level sensor) associated with (e.g., connected to, in contact with, disposed on or within, etc.) mixing chamber 36 and configured to sense or detect the level of material (e.g., water, paste 22, other ingredients, combinations thereof, etc.) within mixing chamber 36. Level sensor 68 may be electrically or electronically connected to electronic control unit 94. Electronic control unit 94 may be configured to receive a level measurement signal from level sensor 68 and control the level of material within mixing chamber 36 based on the level measurement signal from level sensor 68. For example, electronic control unit 94 may be electrically or electronically connected to a valve 70 (e.g., a first valve) configured to control the passage of material from chamber 20 to mixing chamber 36, a valve 72 (e.g., a second valve) configured to control the passage of water from water source 48 to mixing chamber 36, and/or dispensing actuator 24 and configured to control the material level within mixing chamber 36. For instance, electronic control unit 94 may be configured (e.g., programmed with computer-readable instructions, connected to memory storing computer-readable instructions executable by electronic control unit 94, etc.) to control, for example, a valve (e.g., valve 70 for adding material from chamber 20, valve 72 for adding water, etc.), an actuator (e.g., dispensing actuator 24 for adding material from chamber 20), a motor, a pump, an electronic element, or other component of system 10 in order to change or maintain the level of material within mixing chamber 36. In this way, the dosing (i.e., addition) of material (e.g., paste 22, water, etc.) into mixing chamber 36 may be controlled according to predetermined recipe specifications and/or to prevent overfilling of mixing chamber 36. In some embodiments, multiple level sensors may be included in order to detect changes in the material level within mixing chamber 36, for example, to measure and/or control the dosing of multiple ingredients (e.g., paste 22, water, and/or other ingredients) based on the detected material level or change in material level.

Electronic control unit 94 may be configured (e.g., programmed with computer-readable instructions, connected to memory storing computer-readable instructions executable by electronic control unit 94, etc.) to control, for example, valve 70 (for adding material from chamber 20), valve 72 (for adding water), dispensing actuator 24 (for adding material from chamber 20), and/or other valves or actuators of system 10 for dosing materials or ingredients for producing food or beverage products. In some embodiments, electronic control unit 94 may be configured to dose ingredients based on an amount of time that a valve or actuator is operated (in conjunction with other known geometric parameters) to permit precisely dosed amounts of materials to be admitted into mixing chamber. In other embodiments, electronic control unit 94 may be configured to detect other aspects of system 10 to determine an amount of material dispensed from material chamber 20, water source 48, and/or other material sources for dosing into mixing chamber 36. For example, control system 60 may include a dosing sensor 74, such as a position sensor (e.g., a magnetic sensor, proximity switch(es), optical sensor, infrared sensor, laser sensor, etc.) configured to sense or detect the movement or position of dosing actuator 24, a weight sensor (e.g., a scale, a strain gauge, etc.) configured to measure the amount of material within material chamber 20 or mixing chamber 36, or, as mentioned above, multiple level sensors associated with mixing chamber 36 and configured to detect the level or change of level of the contents of mixing chamber 36. It is contemplated that other types of sensors, such as flow rate sensors or other devices may be used to measure and control the flow of materials (such as paste 22, water, and/or other ingredients) into mixing chamber 36.

Electronic control unit 94 may be configured (e.g., programmed with computer-readable instructions, connected to a memory storing computer-readable instructions executable by electronic control unit 94, etc.) to control a valve 76 (e.g., a third valve) for controlling the dispensing of material from mixing chamber 36 into container 18. Electronic control unit 94 may be configured to operate valve 76, for example, for predetermined periods of time in order to dispense corresponding predetermined amounts of food or beverage products into container 18. In some embodiments, electronic control unit 94 may be configured to automatically determine an amount of time to open valve 76 (e.g., based on detected, sensed, determined, or otherwise input quantities of material admitted into mixing chamber 36) in conjunction with known geometric parameters of system 10 and components thereof.

Electronic control unit 94 may be configured (e.g., programmed with computer-readable instructions, connected to the memory storing computer-readable instructions executable by electronic control unit 94, etc.) to control a valve 78 (e.g., a fourth valve) for controlling the exposure of mixing chamber 36 to low pressure source 52. Electronic control unit 94 may be configured to operate valve 78 to control the pressure within mixing chamber 36 to control the reduction of foam inside mixing chamber 36 during mixing operations. Control system 60 may also include a pressure sensor 80 associated with (e.g., connected to, disposed within, etc.) mixing chamber 36 and configured to generate a pressure measurement signal. Electronic control unit 94 may be configured to control valve 78 and or components of low pressure source 52 (e.g., a pump, a motor, a power source, a valve, etc.) based on the pressure measurement signal from pressure sensor 80 to control the pressure within mixing chamber 36, for example, to cause the pressure to match a set pressure value.

Electronic control unit 94 may be configured (e.g., programmed with computer-readable instructions, connected to memory storing computer-readable instructions executable by electronic control unit 94, etc.) to receive, collect, and save (e.g., in memory) data (e.g., measurement data) collected (i.e., sensed or measured) via the sensors of control system 60. Electronic control unit 94 may be configured to monitor data collected via the sensors of control system 60 and determine whether and/or when any data is indicative of a fault or error. For example, electronic control unit 94 may be configured to compare data values to stored reference values and determine whether and/or by how much the data differs mathematically from the reference's values. Electronic control unit 94 may be configured to generate a signal indicative of an error when the difference between sensed or measured data is equal to, greater than, or less than a reference value by a predetermined amount (i.e., by an amount equal to an error value). Error values may be determined empirically or may be assumed, presumed, or adopted based on known information, for example, information about system components provided by component manufacturers or based on prior testing results.

Electronic control unit 94 may be configured (e.g., programmed with computer-readable instructions, connected to the memory storing computer-readable instructions executable by electronic control unit 94, etc.) to control one or more aspects of motor 30 and actuator 44. In an example embodiment, control unit 94 may control a rotational speed of motor 30 and/or actuator 44, torque of motor 30 and/or actuator 44, and the like.

In some embodiments, data collected via the sensors of control system 60 may be used to determine when the supply or reserve of one or more ingredients dispensable by system 10 is running low (i.e., when the stored or reserved quantity is below a threshold amount) or is exhausted. For example, electronic control unit 94 may be configured to monitor data sensed by dosing sensor 74 and determine whether and/or when the material (e.g., paste 22) within material chamber 20 is running low or is exhausted. For example, control unit 94 may be configured to compare data from dosing sensor 74 to reference data stored in memory and determine whether and/or by how much the data differs mathematically from the reference value. When the difference is equal to, greater than, or less than a predetermined threshold value (e.g., a corresponding error value), electronic control unit may be configured to generate a signal indicating that the material supply is low or exhausted.

In some embodiments, electronic control unit 94 may be electrically and/or electronically connected to a communication device (e.g., a radio transceiver) and may be configured to communicate error signals or error messages based on determined error values (such as any of the error values discussed above) to a remote communication device (e.g., a remote computer, mobile phone, server, etc.). The communication device may be a communication device configured to send and/or receive messages via a radio communication protocol, such as WiFi, CDMA, 3G, 4G, LTE, Bluetooth, nearfield communication (NFC), or via a wired communication system, such as telephone, cable, fiber optics, or other connections. In some embodiments, control unit 94 may be accessible via the Internet by a local or remote computing device (e.g., a computer, mobile device, tablet, proprietary hardware, etc.). In this way, any data sensed by the sensors of control system 60 or stored by or within electronic control unit 94, error signals or messages, other diagnostics, and/or data metrics may be accessed by owners, operators, and/or technicians of system 10. In some embodiments, electronic control unit 94 may be configured to allow remote access via the electronic communication mechanisms described above for accessing and manipulating system control settings (e.g., temperature set points, pressure set points, dosing quantities, etc.). In some embodiments, electronic control unit 94 may be configured to automatically send messages, consistent with the description above, indicative of low or exhausted supplies of materials to a remote communication device to effectuate automatic ordering of materials. The control system described above in conjunction with FIGS. 4 and 5 above, as well as individual components of that control system, can be used in any of the embodiments described in this disclosure, including all embodiments described in the drawings.

In some embodiments, system 10 may optionally include a clean-in-place (CIP) system 82 for cleaning and/or sanitizing components of system 10, as shown in FIG. 4. For example, CIP system 82 may include a cleaning material source 84 configured to store a cleaning material. CIP system 82 may be configured to introduce cleaning material into parts of system 10, for example, by admitting cleaning material into the water supply conduit connected to mixing chamber 36, for example, via a valve 86. It is contemplated that cleaning material source 84 and valve 86 may be connected to different parts of system 10, such as, for example, to material chamber 20 and/or any intervening component between material chamber 20 and mixing chamber 36. Electronic control unit 94 may be configured to operate valve 86 and/or the water supply to automatically administer cleaning material or in response to an explicit command by a user (e.g., received via an input device electronically or electrically connected to electronic control unit 94).

In some embodiments, electronic control unit may be configured to automatically prime system 10 with the material, such as paste 22. For example, electronic control unit may be configured to operate the dispensing actuator at predetermined times (e.g., upon startup of the system, after replacement of a material cartridge in material chamber 20, upon explicit command of a user, etc.) in order to ensure no voids or air gaps exist between material chamber 20 and mixing chamber 36. In this way, electronic control unit 94 may be configured to prime system 10 and ensure accurate and precise dosing of material (e.g., paste 22) into mixing chamber 36.

Figure 6:
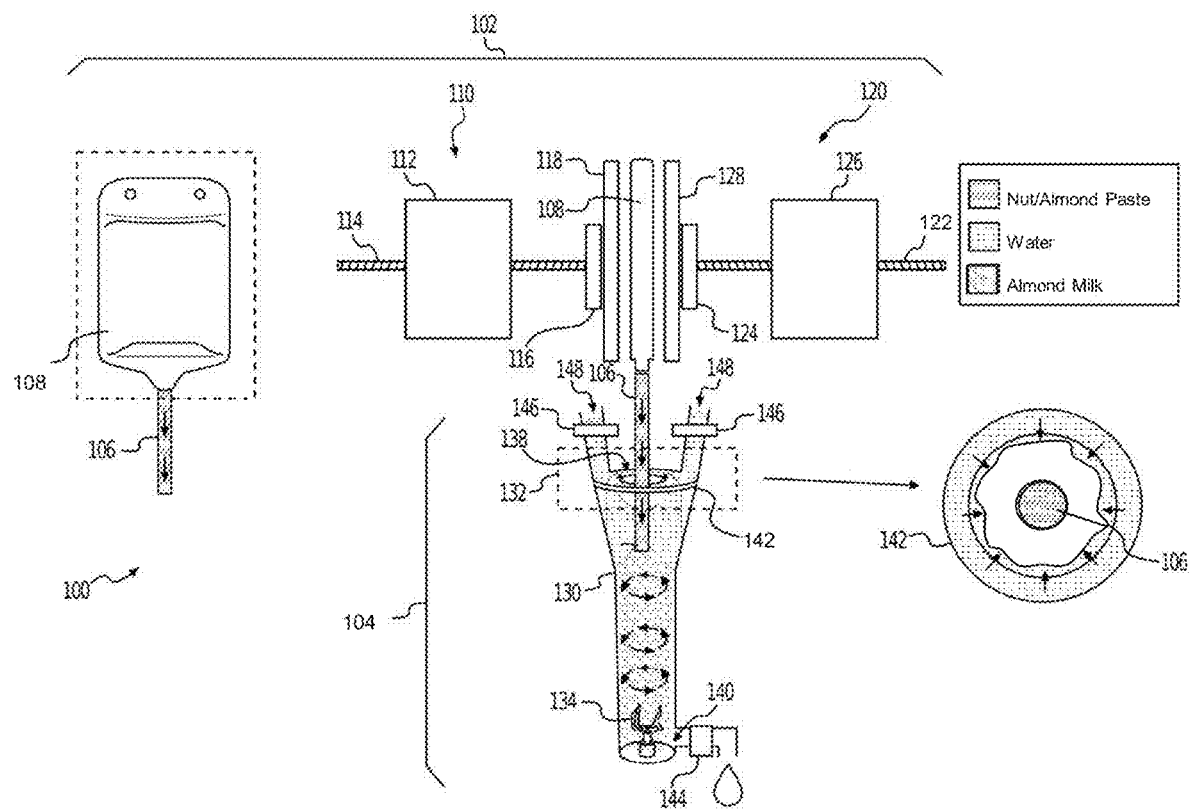
FIG. 6 is an exemplary disclosed system for producing a food or beverage product, consistent with embodiments of this disclosure.

FIG. 6 shows another exemplary system 100 for producing a food or beverage product. The system 100 may include a material dispensing system 102 and a mixing system 104. The material dispensing system 102 may be configured to dispense material (e.g., nut paste 106) from a flexible container 108, such as a pouch or packet, into mixing system 104. For example, material dispensing system 102 may be configured to press or squeeze flexible container 108 to dispense a predetermined quantity of material that corresponds to a single serving of food or beverage product. That is, flexible container 108 may be sized, shaped, and/or otherwise configured to contain a predetermined amount of material corresponding to a single serving of food or beverage product such that when dispensing system 102 presses or squeezes flexible container 108, the predetermined amount of material sufficient to produce a single serving of food or beverage product is dispensed, and the flexible container 108 may then be discarded and replaced by another flexible container to produce a subsequent serving. It is contemplated, however, that flexible container 108 may also be sized to contain a quantity of material that corresponds to multiple servings of food or beverage product.

Material dispensing system 102 may include a dispensing actuator 110 (e.g., a first dispensing actuator). Dispensing actuator 110 may be configured to dispense material, such as paste 106, from the flexible container 108 into mixing system 104. Dispensing actuator 110 may include a motor 112, an actuating member 114, and an implement 116. Motor 112 may be or include an electric motor, such as a direct current (DC) motor or servomotor. It is contemplated that motor 112 may alternatively be or include an alternating current (AC) electric motor. In some embodiments, the desired precision of dispensed quantities of material from flexible container 108 may partially define the requirements (and thus the design) of motor 112 and/or the suitability of various types of commercially available electric motors that may be used. For example, in some instances, relatively precise or fine control of motor 112 may be required to enable relatively precise dispensing or "dosing" of material from flexible container 108. Motor 112 may be selected to provide sufficient control for achieving the desired dispensing or dosing precision. Motor 112 may also or alternatively be configured to perform a single predetermined actuation for dispensing the same amount of material each time. In some embodiments, motor 112 may be a different type of motor than an electric motor, such as a pneumatically driven or hydraulically driven motor. It is contemplated that similar considerations of dispensing or dosing precision may be addressed for pneumatic or hydraulic motors by considering motor parameters, such as pressure, displacement, rotational speed, rotational direction, as well as application considerations (e.g., size, cost, complexity, serviceability, maintenance, sanitation, etc.). It is to be appreciated that motor 112 may be equipped with a suitable power source, such as an electrical power source (e.g., a battery, a capacitor, a power supply, a direct connection to utility power, etc.), a pneumatic power source (e.g., a compressor, a tank, an accumulator, etc.), a hydraulic power source (e.g., a pump, a tank, an accumulator, etc.), and associated electrical or mechanical conduit. Actuating member 114 may be configured to transfer power from or be driven by motor 112 for dispensing or dosing material flexible container 108. For example, actuating member 114 may be a screw-type member, such as a worm gear, screw gear, auger, or another type of device configured to transfer power through rotational motion. For example, actuating member 114 may be threaded and configured to move translationally (e.g., parallel to its rotational axis) as it rotates within a stationary threaded device to cause implement 116 to move and force material out of flexible container 108. In other embodiments, actuating member 114 may be threaded and configured to rotate without translational motion to cause implement 116 to translate via forces applied through corresponding threaded features associated with implement 116. In other embodiments, actuating member 114 may be or include other components, such as levers, gears, pulleys, belts, chains, or combinations thereof. It is contemplated that actuating member 114 may be configured to transfer power from motor 112 to material within a flexible container in order to cause material within the flexible container to be forced out of the flexible container as desired, and thus actuating member 114 may be designed a number of different ways to achieve this function.

In some embodiments, implement 116 may be or include a plunger, a plate, a cap, or any other suitable implement for pressing. In some embodiments, a plate 118 may be disposed between dispensing actuator 110 and a flexible container 108. Plate 118 may be configured to distribute the force applied by a dispensing actuator along a surface, side, width, or length of flexible container 108. In some embodiments, the force applied by the dispensing actuator may be opposed by a permanent structure, such as a fixed plate, wall, floor, or another component. In other embodiments, dispensing system 102 may include another actuator 120 (e.g., a second actuator). The second actuator 120 may include a second actuating member 122 and a second implement 124 driven by a second motor 126 against a second plate 128.

Dispensing system 102 may be configured to apply force to flexible container 108 to cause material (e.g., paste 106) to be dispensed from flexible container 108 into mixing system 104. For example, dispensing actuator 112 (and/or dispensing actuator 120) may be operated to force material (e.g., paste 106) to be dispensed from flexible container 108 into mixing system 104 along the direction of gravitational force. That is, a flexible container may include an opening (e.g., a nozzle, a nipple, a valve, etc.) positioned to allow material to exit flexible container 108 and pass (e.g., fall) into mixing system 104. In some embodiments, flexible container 108 may be vertically oriented, generally vertically oriented, or approximately vertically oriented. It is contemplated that flexible container may alternatively be tilted, slanted, or angled such that material is dispensed from flexible container 108 so as to move, pass, or fall at least partially along the direction of gravitational force. In other embodiments flexible container 108 may be oriented horizontally, generally horizontally, or approximately horizontally.

Mixing system 104 may include a mixing chamber 130 configured to receive material from dispensing system 102. Mixing system 104 may also include a water dispenser 132 and a mixer 134. Water dispenser 132 may be configured to introduce water into mixing chamber 130 in such a way as to promote mixing of water and paste 106. Mixer 134 may be configured to mix the water and paste 106 to produce a mixed food or beverage product. Mixing chamber 130 may include an opening positioned and configured to dispense the mixed product.

Mixing chamber 130 may have any suitable shape, such as a cylindrical, spherical, rectangular, conical, combinations thereof, or another shape. Mixing chamber 130 may be formed of any suitable material, such as metal, plastic, glass, and/or another type of material. Mixing chamber 130 may include an opening 138 (e.g., a first opening) to receive material from dispensing system 102. Mixing chamber 130 may also include another opening (e.g., a second opening) 140 for dispensing material (e.g., a food or beverage product) from mixing chamber 130. In some embodiments, mixing chamber 130 may be cooled. For example, mixing chamber 130 may be surrounded by a component or container (e.g., a cooling jacket) configured to allow a cooling agent to surround and contact mixing chamber 130 for cooling the contents the mixing chamber. In some embodiments, space surrounding mixing chamber 130 may be cooled (e.g., using a refrigeration system) to allow mixing chamber 130 to be positioned in a cooled environment for causing the contents of the chamber to be cooled.

Water dispenser 132 may be configured to introduce water into mixing chamber 130 in such a manner that promotes the mixing of water and paste 106. For example, in some embodiments, water dispenser 132 may include a ring-like or conical mixing portion 142. Mixing portion 142 may be configured to cause water to pass through an opening or flow along a surface to promote or cause the formation of circular or centrifugal water flow. In some embodiments, the mixing portion 142 may be shaped to cause the formation of a water sheet or waterfall. The water sheet or waterfall may, in part, be conical, hemispherical, or another shape. The water sheet or waterfall may, by its shape and/or velocity, be configured to promote the mixing of water with paste 106 as paste falls or is otherwise introduced into mixing chamber 130. In this way, water and paste 106 may mix quickly and thoroughly as both components are introduced into mixing chamber 130, even before they are further mixed by mixer 134. The water sheet or waterfall may also, by its shape and/or velocity, be configured to inhibit or prevent splashing of water or paste 106 outwards from mixing chamber 130. In this way, water and paste 106 may be directed into mixing chamber 130, even if there is a gap or space between flexible container 108 and opening 138, without water or paste splashing back towards flexible container 108 or otherwise out of mixing chamber 130.

Mixer 134 may be configured to mix the contents of mixing chamber, for example, to cause the contents to mix thoroughly together to produce a mixed food or beverage product. In some embodiments, mixer 134 may be located at or near a bottom of mixing chamber 130.

Mixer 134 may be configured to rotate or spin to impart a rotational, tornadic, or centrifugal velocity on the contents of mixing chamber 130 to promote mixing. Mixer 134 may include components, such as blades or other implements, configured to cause the contents of mixing chamber to be drawn towards mixer 134. Materials drawn towards mixer 134 may contact mixer 134 or its implements and be pulverized, chopped, stirred, blended, or otherwise mixed. In other embodiments, mixer 134 may be located above the bottom of mixing chamber 130. For example, mixer 134 may be configured to allow material to pass by mixer 134 while or after being drawn toward mixer 134.

In some embodiments, the second opening 140 may be positioned near the bottom of mixing chamber 130. In this way, mixed food or beverage product (e.g., almond milk) may be allowed to flow out of mixing chamber 130 due to the force of gravity without the assistance of a pump or other mechanism. In other embodiments, second opening 140 may be positioned elsewhere, such as above the bottom of mixing chamber 36 (e.g., on a side or wall of mixing chamber 130). A valve 144 may be positioned in or near (e.g., upstream of or downstream of) opening 140 to prevent, permit, or selectively control the flow of mixed food or beverage product from (i.e., out of) mixing chamber 130.

One or more valves 146 may be positioned in or near water inlets 148 associated with (e.g., fluidly connected to or functionally cooperative with) water dispenser 132. Inlets 148 may be connected to a suitable water source, such as a water tank, water reservoir, or utility water source. In some embodiments, the water source may be refrigerated to cause water to be introduced into mixing chamber 130 at an appropriate temperature, such as a predetermined temperature suitable for immediate consumption or to promote food safety (e.g., by inhibiting or preventing spoilage of the contents of mixing chamber 130).

It is expressly contemplated that features of the embodiment of FIGS. 4 and 5 may be incorporated into the embodiment of FIG. 6 in any combination or collectively in their entirety. The features described above with respect to FIGS. 4 and 5 may be included, incorporated, or implemented in the embodiment of FIG. 6 in the same or similar manner and for the same or similar purpose as described above with respect to FIGS. 4 and 5. Thus, the features of FIGS. 4 and 5 will not be described again in structure or in function. But for the avoidance of doubt, it is expressly contemplated that the valves, sensors, mixers, electronic control units, actuators, CIP systems, material sources, and all respective components thereof, and all respective methods and processes, and all control, diagnostic, servicing, and communication techniques, which were described above in detail with respect to FIGS. 4 and 5, may be included, incorporated, or otherwise implemented in the embodiment of FIG. 6 in the same or similar way for the same or similar purpose.

It will be apparent to those skilled in the art that various modifications can be made to the food and beverage product mixing and dispensing system of the present disclosure without departing from the scope of the disclosure. Other embodiments will be apparent to those skilled in the art from consideration of the specification and practice of the food and beverage product mixing and dispensing system disclosed herein. It is intended that the specification and examples be considered as exemplary only, with a true scope of the disclosure being indicated by the following claims and their equivalents.

Figure 7:
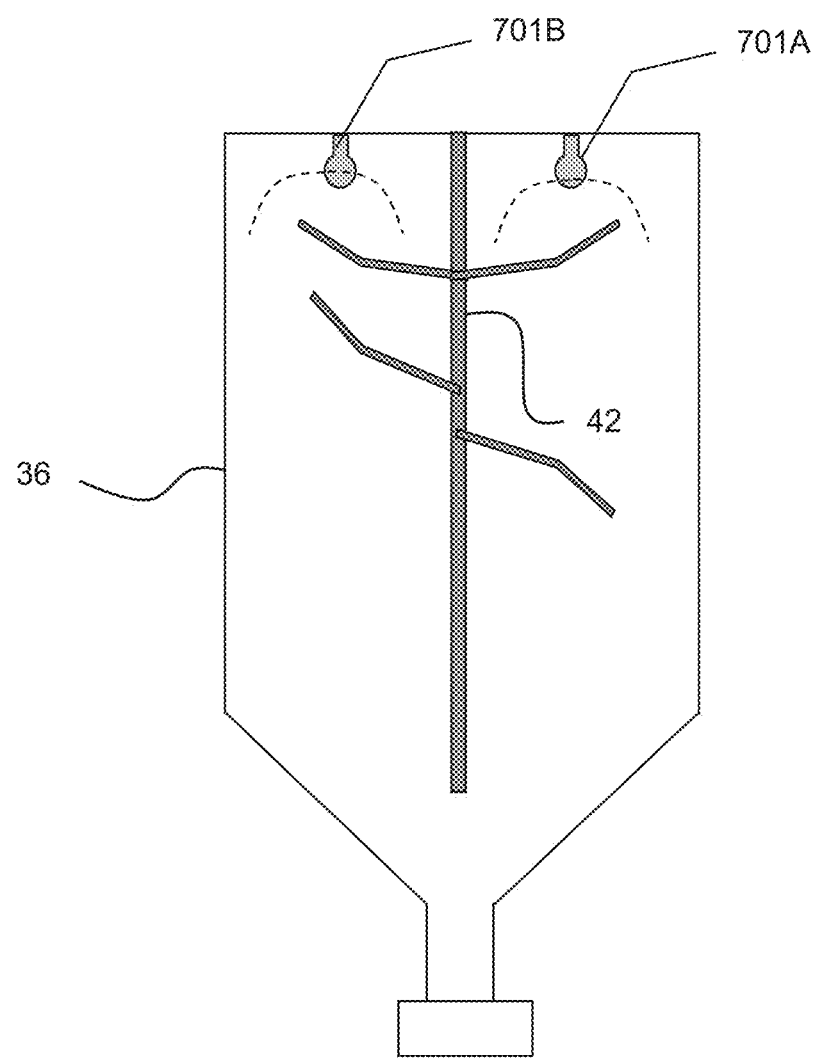
FIG. 7 is a schematic illustration of a mixing chamber, consistent with embodiments of this disclosure.
Figure 8:
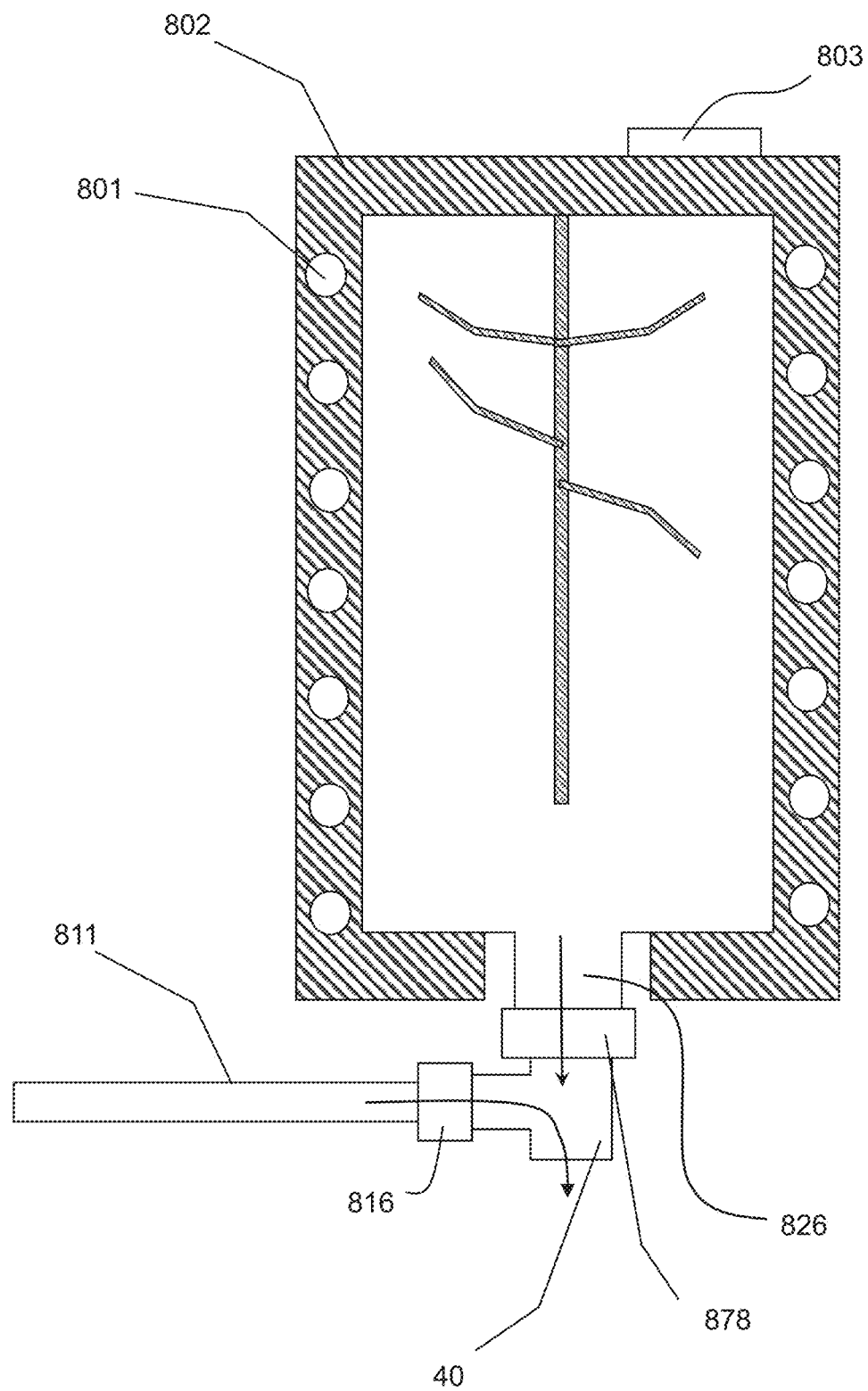
FIG. 8 is another schematic illustration of a mixing chamber, consistent with embodiments of this disclosure.

FIGS. 7 and 8 describe additional aspects of mixing chamber 36 consistent with disclosed embodiments. For example, FIG. 7 shows that chamber 36 may be rinsed using spray balls 701A and 701B as shown in FIG. 7. Spray balls 701A and 701B may be positioned at the top portion of mixing chamber 36 and may dispense water over all the internal surfaces of mixing chamber 36. Additionally, or alternatively, spray balls may be positioned at the bottom of the chamber 36, at the sides of chamber 36 or at any suitable location that allows for an adequate rinse of chamber 36. Spray balls 701A and 701B may be positioned to spray not only the internal surfaces of chamber 36 but also various surfaces of mixing tool 42. In an example embodiment, mixing chamber 36 may be engaged in mixing the water dispensed during the rinse process (also referred to as a rinse cycle). For example, during the rinse cycle mixing tool 42 may be activated in order to mix water dispensed into mixing chamber 36 during the rinse cycle. In various embodiments, spray balls 701A and 701B may vary spray power and direction to adequately spray the internal surfaces of mixing chamber 36.

In various embodiments, as discussed above, mixing chamber 36 may be cooled to maintain the target temperature of beverage product 56 inside chamber 36. For example, FIG. 8 shows a cooling jacket 802 adjacent to external surfaces of chamber 36. In various embodiments, cooling jacket 802 may be formed from a heat conductive material, (e.g., copper, aluminum, stainless steel, aluminum/copper/ magnesium alloys, and/or the like). Cooling jacket 802 may be conductively connected to the external surfaces of chamber 36, wherein the term "conductively connected" implies that the heat from chamber 36 may be conducted away from chamber 36 via jacket 802. In various embodiments, jacket 802 may include channels 801 for flowing cooling liquid (e.g., cooled water, coolant, etc.), for convectively transfer heat from jacket 802 to a heatsink/ambient environment or the like. In various embodiment, the rate of heat transfer from chamber 36 may be determined by the temperature of the flowing cooling liquid and by the flow rate of the cooling liquid. In various embodiments, both the temperature and flow rate of the flowing cooling liquid may be controlled by a heat transfer controller. In some embodiments, jacket 802 may include a temperature sensor 803 for measuring temperature over an area of jacket 802. The data from sensor 803 may be used by the heat transfer controller to modify the cooling rate for chamber 36. In some embodiments, beverage product 56 within mixing chamber 36 may be maintained at a temperature in the range of 33-48 degrees Fahrenheit.

FIG. 8 shows opening 826, with valve 76 as well as conduit 811 with valve 816 for flowing an auxiliary product. In an example embodiment, the auxiliary product may include flavors, additives, food coloring and/or the like. In various embodiments, beverage product 56 and the auxiliary product may be flown via outlet 40. Valve 878 may be a unidirectional valve allowing beverage product 56 to flow out of mixing chamber 36 and preventing the auxiliary product entering chamber 36. Similarly, valve 816 may be a unidirectional valve allowing the auxiliary product to exit outlet 40 but preventing any other substance (e.g., beverage product 56) to enter conduit 811 carrying the auxiliary product.

Figure 9:
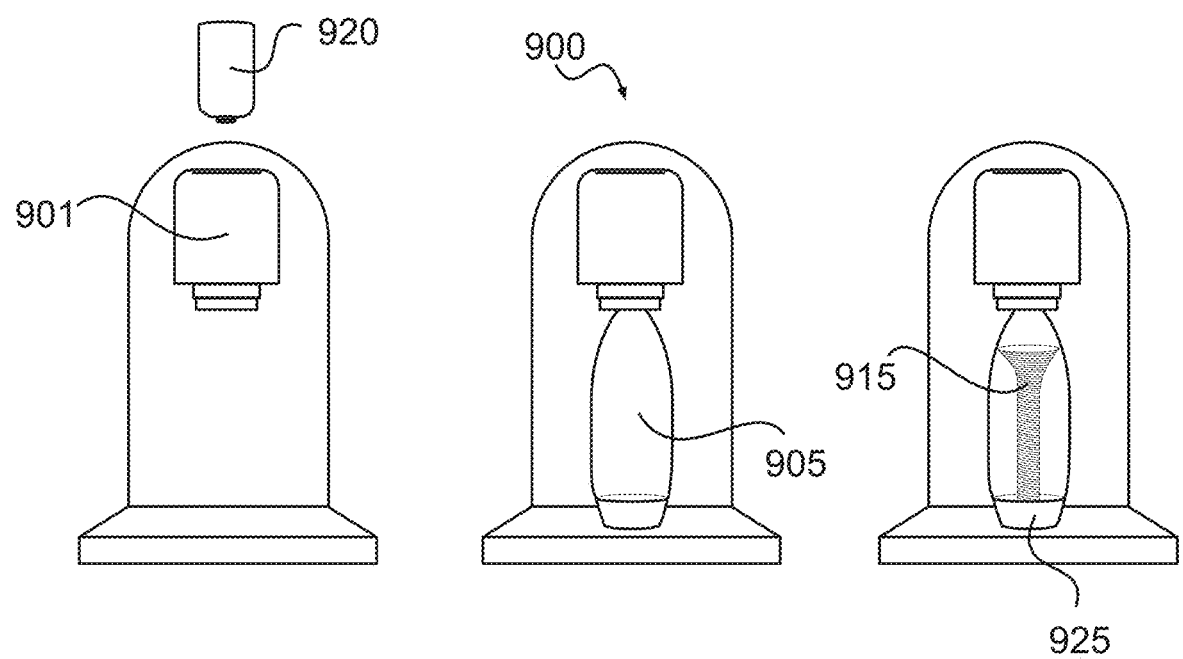
FIG. 9 is an exemplary disclosed system for producing a food or beverage product, consistent with embodiments of this disclosure.
Figure 10:
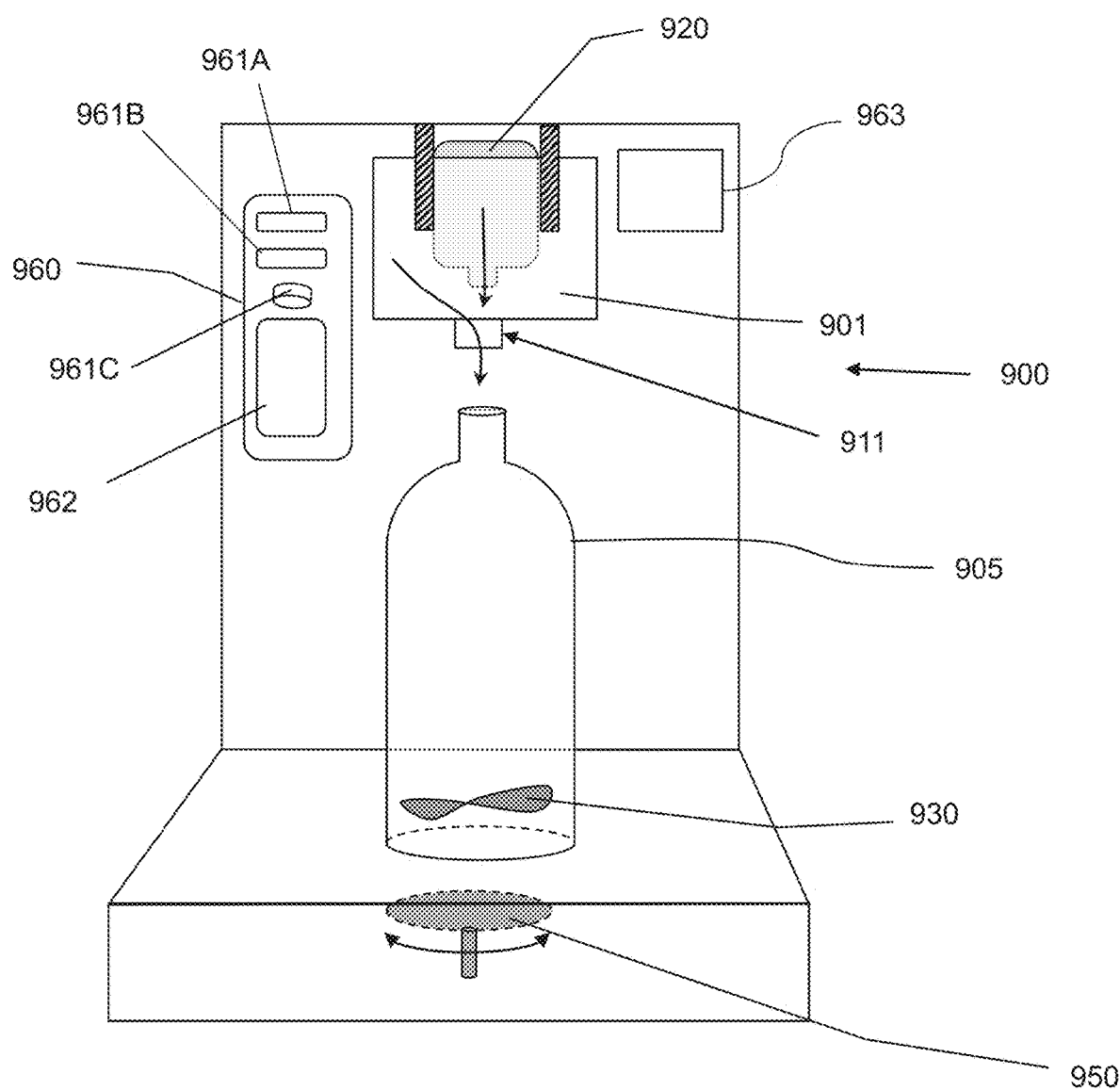
FIG. 10 is another exemplary system for producing a food or beverage product, consistent with embodiments of this disclosure.

FIGS. 9 and 10 relate to an embodiment of a system 900 for producing a food or beverage product, where container 905 may be used as a mixing chamber for the beverage product. In an example embodiment, system 900 may include a dispensing system 901 for dispensing liquid (e.g., water) and a dairy-free base product (e.g., paste) into container 905. In an example embodiment, a dairy-free base product may be contained in a pouch 920 (e.g., pouch 920 may contain paste 22). In various embodiments, system 900 may be a desk unit having a size similar to the size of a coffee machine. In various embodiments, pouch 920 may be similar to pouch 20 described in previous embodiments (e.g., embodiments related to FIG. 2). For example, pouch 920 may include a valve (similar to valve 41 as shown in FIG. 1), a head unit, a conduit (similar to conduit 21A, as shown in FIG. 1) attached to the head unit, etc. In various embodiments, pouch 920 may be inserted into a dispensing system for dispensing into container 905. Dispensing system 901 may dispense paste from pouch 920 by squeezing pouch 920, by applying pressure difference at the valve 41, and/or by using any other suitable methods Similar to pouch 20, pouch 920 may be formed from food grade elastic materials.

In an example embodiment, water may be dispensed in container 905 followed by dispensing paste 22 in container 905. Container 905 may include a mixing element that may generate a vortex (e.g., mixing vortex 915, shown in FIG. 9). In an example embodiment, container 905 may have a removable bottom section 925, that may contain the mixing element (e.g., a mixing blade). In an example embodiment, bottom section 925 may be formed from a non-magnetic material (e.g., aluminum, non-magnetic stainless steel, plastic, etc.). Section 925 may be threadedly connected to container 905 (i.e., bottom section 925 may be unscrewed to extract the mixing element).

FIG. 10 shows a mixing element 930 that may either float inside container 905 or may be connected to the bottom of container 905 (not shown). FIG. 10 shows an example embodiment including a rotating magnet 950 directing a mixing element (e.g., element shaped as a blade, bar, pill, etc.) that may be formed from magnetic material to spin executing mixing of the beverage product in container 905. FIG. 10 shows that dispensing system 901 may dispense paste 22 from pouch 920 and water through opening 911. In various embodiments, system 900 may include a control system 963 for controlling various aspects of operations of system 900 (e.g., water flow rate, the temperature of various components, paste 22 flow rate, etc.). Control system 963 may incorporate concepts from the control system described above in conjunction with FIGS. 4 and 5 above. In addition, system 900 may have an input panel 960 with various input controllers 961A-C as well as display devices 962 that may allow a user to interact with every aspect of operations of system 900.

In various embodiments, systems and methods of the present disclosure are related to processes of forming a cereal paste such as oats-based paste. While various aspects of the disclosure discuss oats-based paste, it should be noted that various embodiments may not be limited to oats-based paste and may be applied to paste formed from other grains or nuts such as quinoa, Kamut, wheat, spelt, rye, oats, wild rice, fonio, teff, coconut, almond, brazil nut, cashew, pinenut, hazelnut and/or the like. However, some aspects of the processing steps used to form oats-based paste may differ for oats as compared to other grains, such as oats, in many respects, are different from other cereals. For example, oats have higher protein and fat contents as well as a lower carbohydrate content than comparable cereals. In addition, oats have a high starch content and do not contain a significant amount of oil.

Consistent with disclosed embodiments, a system and a method for providing an efficient, selective and economical method for producing a cereal paste and cereal suspension is provided. The cereal suspension is formed to have viscosity and taste that may be similar to milk or grain-based or nut-base milk products. In addition, a system and a method for forming a homogeneous and stable cereal suspension containing intact vitamins and soluble dietary fibers (e.g., β-glucans) are provided. In various embodiments, a cereal suspension may be a movable liquid (i.e., has a consistency of paint or cream) that may be shelf stable due to low moisture content (e.g., the moisture content may be less than 12%).

Figure 11:
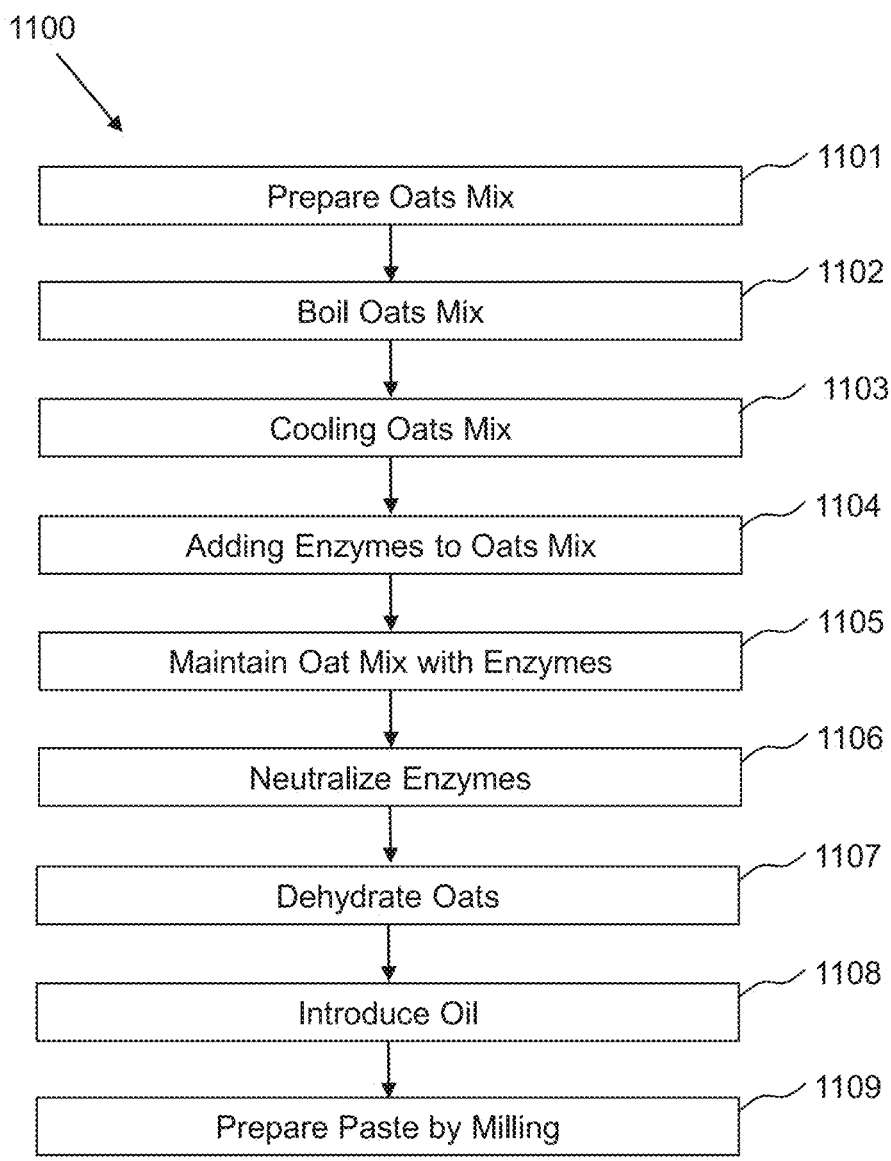
FIG. 11 is an illustrative process of forming a cereal paste consistent with disclosed embodiments.

Various steps of the method of forming cereal paste are described by a process 1100 shown in FIG. 11. At a step 1101, of process 1100, oats (e.g., rolled oats, steel cut oats, Irish oats, Scottish oats, old fashion oats, whole oat groats, etc.) are mixed with water at a suitable ratio. In an example embodiment, oats may be mixed with water at a weight ratio of 1:1 or 1:10. In an example embodiment, a weight ratio in the rage of 1:1 to 1:10 may be used. For example, in an embodiment, a weight ratio of 1:2 may be used. It should be understood that the above weight ratios are suggestive and/or illustrative, and in some embodiments, other ratios may be used. The term "weight ratio" refers to the ratio of the weight of oats to the weight of water.

At step 1102 the mix of oats and water may be brought to a boil, and subsequently boiled for a target duration of time. In an example embodiment, the target duration of time may be one to a few minutes, and in some embodiments, boiling may range from half a minute to a few tens of minutes. In some embodiments, boiling temperature may be 100° C. (212° F.) under standard atmospheric conditions, and in some embodiments, pressurized boiling can be used with boiling temperatures reaching 100 to 150° C. (221 to 302° F.). In some embodiments, a mix of oats and water may be soaked prior to boiling. For example, the mix of oats and water may be soaked for several hours prior to boiling.

After step 1102, a step 1103 of cooling the mix of oats and water may be taken. In an example embodiment, the mix is cooled to 60 to 70° C. (140 to 160° F.). Cooling may be accompanied by convective cooling (e.g., exposing mix to room temperature), conductive cooling (e.g., placing ice into a cooling mix) or any other appropriate cooling. The cooling process may be a slow process (e.g., cooling for 30 minutes to an hour by exposing mix to room temperature) or a fast process (e.g., by placing the mix into a refrigerator, by flowing air above the mix using airflow, or using a cooling heat exchanger).

Once the oat and water mix has been cooled, enzymes may be added. The amount of enzymes (by weight) is calculated based on oats dry weight. For example, in the mix of 1:10, one pound of oats is mixed with 10 pounds of water, the dry weight of oats is one pound, and this weight is used for calculating the weight of enzymes that are needed to be added. In an example embodiment, the mix of oats and water may be treated with amylase such as α-amylase. The amylase is a protein enzyme that hydrolyzes alpha bonds of large, alpha-linked polysaccharides, such as starch and glycogen, yielding glucose and maltose. Amylase may operate at a relatively high-temperature range of 60-90° C. (140-194° F.) and may result in a rapid reduction of the viscosity of gelatinized starch. In various embodiments, amylase may be added at a weight of 0.15 to 1 percent relative to the dry weight of oats. In various embodiments, various types of amylase may be used at various temperatures. For example, α-amylase may be used at a temperature range of 60-90° C. (140-194° F.). In some embodiments, the temperature range may be 60-70° C. (150-160° F.). Additionally, or alternatively, β-amylase may be used as well. In an example embodiment, β-amylase may be used at a temperature range of 54-66° C. (130-150° F.).

In various embodiments, the pH range for the α-amylase may be 5.5 to 6.5, with a possible maximum at 5.9. The activity of α-amylase may be inactivated below pH 5.0. For β-amylase, the pH range may be different. For example, pH range for β-amylase may be in the range of 4.0-5.0. In an example embodiment, α-amylase may be added first when the mix of oats and water is at a higher temperature and higher pH. After treating the mix with α-amylase, the temperature of the mix may be lowered (e.g., by cooling the mix) and pH may be lowered (e.g., by adding a pH lowering solution (e.g., acidity regulators such as sorbic acid, citric acid, etc.). It should be understood, that in various embodiments, only one type of amylase may be added. For example, only α-amylase may be added.

In various embodiments, a glucoamylase, also known as amyloglucosidase or AMG, may be added either simultaneously with α-amylase or β-amylase or following the addition of α-amylase or β-amylase. In an example embodiment, glucoamylase may be added at a weight of 0.2 to 0.5 percent relative to the dry weight of oats. Glucoamylase may break down the starch that occurs naturally in oats. In addition, glucoamylase cleaves off a glucose molecule from the end of starch polysaccharide molecules. Thus, it can also break apart disaccharides (2-sugar molecules) like maltose that may be produced after treating the mix of oats and water with α-amylase or β-amylase.

At a step 1105 of process 1100, the mix of oats and water with the added enzymes may be maintained at temperatures of (140-160° F.) for a target period of time (e.g., few hours). In an example embodiment, the mix may be maintained at temperatures of (140-160° F.) for a period of time of one to three hours. The exact temperature and time that needed for enzymes to react with the mix of oats and water may vary depending on the type of oats used. For example, for whole oats or rolled oats, it may take a longer time to react with enzymes during step 1105. For oats prepared as small pieces, step 1105 may be shortened as compared to oats prepared as rolled oats.

At a step 1106 of process 1100, the enzymes may need to be neutralized. For example, the mix of oats and water may be boiled or roasted in a later process after oats are dried. For example, the mix may be boiled for an hour or any suitable amount of time that is necessary to completely neutralize the enzymes. Additionally, or alternatively, the mix may be placed under increased pressure (i.e., the mix can be pressurized) and heated at a temperature and pressure suitable for neutralizing the enzymes. In an example embodiment, the temperature may be in a range of 180-300° F. and pressures may be 1 to 250 bar of absolute pressure. In an example embodiment, under increased pressure and temperature, enzymes may be neutralized within minutes.

At a step 1107 of process 1100, the mix of oats and water may be dehydrated to result in oats with low moisture content. In an example embodiment, the moisture content may be up to 6% of the entire weight of the resultant dehydrated oats. In another example embodiment, the moisture content may be less than 3% of the entire weight of the resultant dehydrated oats. In some embodiments, however, the moisture content may be less than 2% of the entire weight of the resultant dehydrated oats. Dehydration may be achieved using any suitable means such as using drum dryer or a fluid bed dryer (also referred to as spray dryer), as well as using a roaster/dryer for larger sized oats. It should be noted that any other appropriate drying technique can be used or combined with drum dryer or fluid bed dryer. For example, using an additional step of centrifugation, some of the moisture content may be eliminated prior to using drum dryer or fluid bed dryer. In various embodiments, either partly during drying step 1107 or after the completion of the drying step 1107, at a step 1108, a plant-based oil may be admixed with dehydrated oats. Is should be noted that mixing plant-based oil is possible when the moisture content of oats is sufficiently low. For example, the moisture content of oats may be less than 3%, or even less than 2%. In an example embodiment, the oil-to-oats weight ratio may be 2/8, or 3/7 or a ratio between 3/7 and 2/8, where ratio 2/8 means, for example, that for every 2 pounds of oil there are 8 pounds of dehydrated oats. In various embodiments, a flavorless plant-based oil can be used. For example, a grapeseed oil, or sunflower oil may be used. In some embodiments, several different types of oils may be used. In an example embodiment, the oil may be mixed with oats in any suitable means (e.g., mixers, etc.).

At a step 1109 of process 1100 dehydrated oats mixed with oil are milled to small particle sizes of 1 to 60 microns. In an example embodiment, the average particle size may be 10 to 20 microns. In various embodiments, oats may be milled using various suitable approaches (e.g., grinder mills such as colloid mills, stone mills, conche, chocolate refiners/melangers, etc.). In an example embodiment, oats may be first milled to a first size (e.g., size of few millimeters) using a first grinder or cutter, and then milled to a second size (e.g., tens of microns) using a second grinder/refiner. In various embodiments, more than two grinders may be used for milling oats. After completion of step 1108, the oats and oil mix may form a viscous colloidal substance (e.g., a substance with viscosity and consistency of peanut butter or paint). In various embodiments, the size of the milled particles is selected to produce a shelf stable colloid (i.e., colloid that maintains consistency and the oats and oil do not separate).

After completion of step 1109, a cereal paste containing milled oats and oil may be stored into enclosures. For example, the cereal paste may be stored in flexible pouches such as plastic pouches. In an example embodiment, cereal paste with low moisture content (e.g., less than 3% by weight) may preserve well with time.

In various embodiments, other ingredients may be added to the cereal paste that may include various amino acids as well as powders of proteins, fibers, nuts, seeds, grains, functional ingredients and/or spices such as turmeric or matcha, various adaptogens such as maca or ashwagandha, protein isolates (e.g. hemp, or pea protein), and/or the like. The powders of other ingredients have to be milled to about the same particle size as the oats to provide a consistent, stable colloid. In various embodiments, other seeds and/or grains may be processed by suitable enzymes prior to milling them into powders, using steps similar to steps 1101-1109 of process 1100 for forming the oats-based paste. In various embodiments, the overall moisture content has to be low after adding other ingredients, to maintain the stability of the colloid solution and to prevent the cereal paste from getting spoiled.

Figure 12:
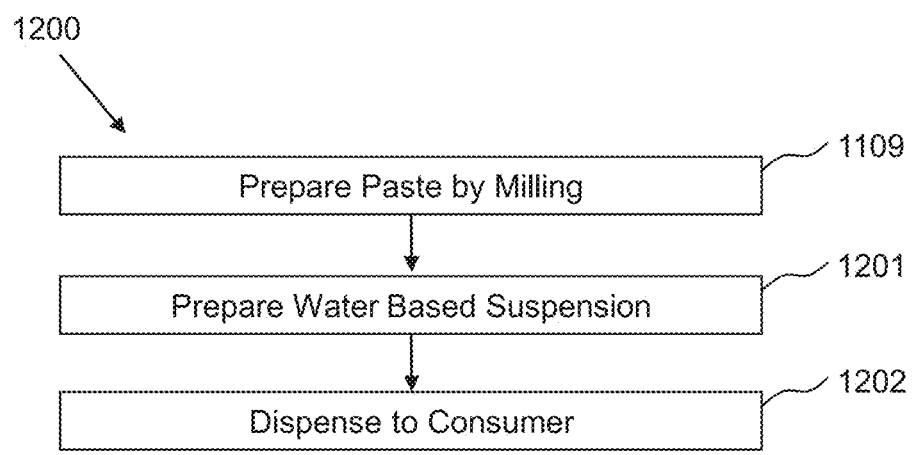
FIG. 12 is an illustrative process of forming a cereal suspension consistent with disclosed embodiments.

FIG. 12 illustrates process 1200 for forming a cereal suspension form the cereal paste. At step 1109 the cereal paste may be prepared as described above. At a step 1201, the cereal suspension may be formed by mixing water and the cereal paste. In an example embodiment, the cereal paste may be mixed/emulsified with water at a weight ratio that may range from 5 to 20 percent. In various embodiments, additives and flavors may be added as needed. For example, a syrup may be added for suitable flavor. In some embodiments, a device for dispensing cereal suspension may allow a user to choose the consistency of cereal suspension by selecting desired paste-to-water ratio. At step 1202, the cereal-based milk may be dispensed to a consumer (e.g., system 10, as shown in FIG. 1, may dispense cereal-based milk via outlet 40, as shown in FIG. 1).

Figure 13:
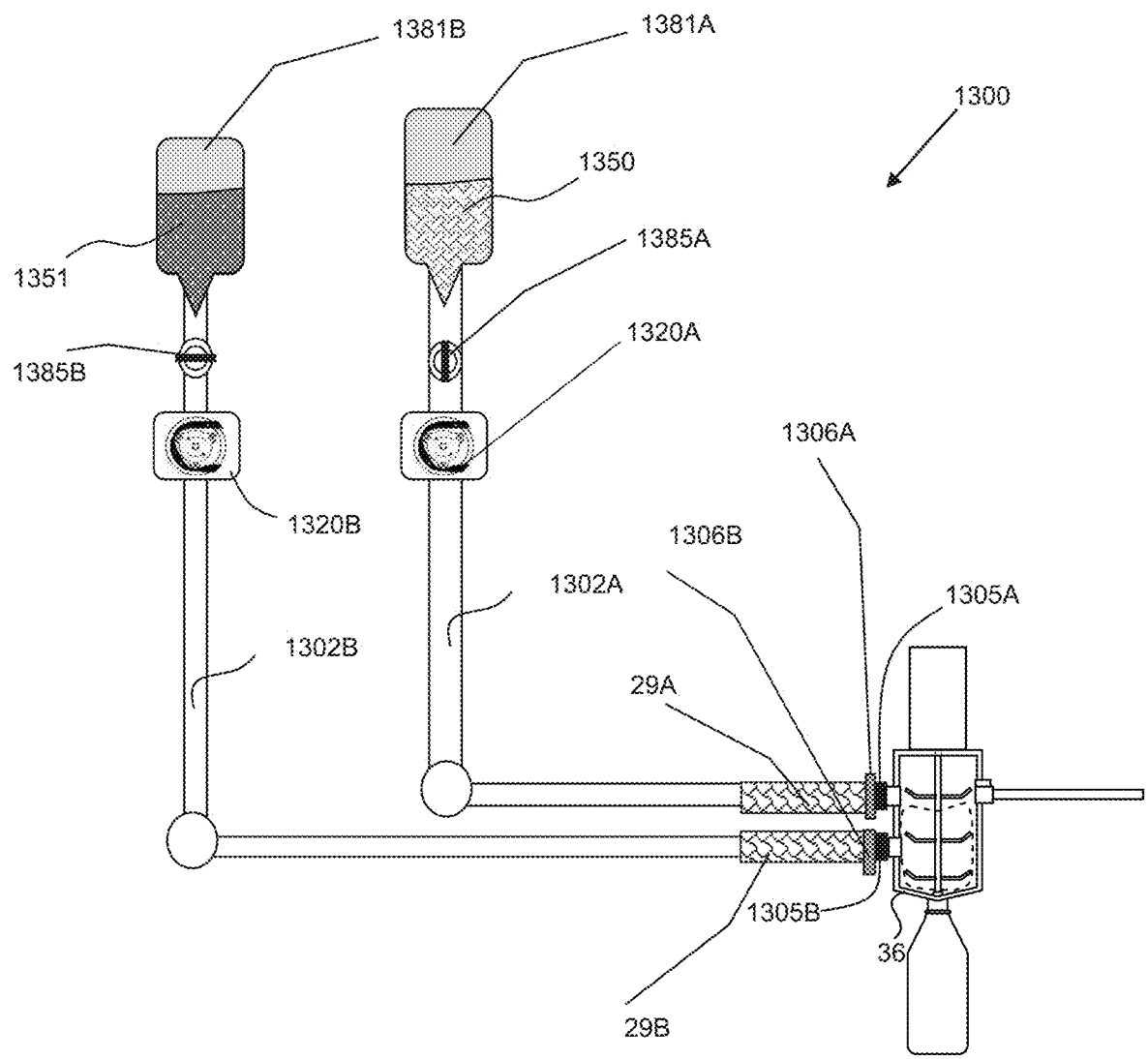
FIG. 13 is an illustrative system for forming and dispensing one or more products consistent with disclosed embodiments.

An exemplary embodiment of a food or beverage product mixing and dispensing system 1300 is illustrated in FIG. 13, where system 1300 may include one or more chambers (e.g., chambers 1381A and 1381B configured to store food or beverage material, such as a cereal paste 1350 or a nut-based paste 1351 for producing a beverage product 56). System 1300 may also include dispensing actuators 1320A and 1320B configured to cause the cereal paste 1350 or nut-based paste 1351 to be dispensed from corresponding chambers 1381A and 1381B into a mixing chamber 36 of system 1300. In some embodiments, system 1300 may also include static mixers/emulsifiers 29A and 29B configured to cause material dispensed from chambers 1381A or 1381B to be at least partially mixed before the material is received by a mixing chamber 36. It should be noted that cereal paste 1350 and nut-based paste 1351 are only illustrative and any other suitable material for forming food or beverage product may be used.

In various embodiments, chambers 1381A and/or 1381B may be flexible pouches and may be formed from any food grade material such as high-density polyethylene, polyethylene terephthalate, fluoropolymer and/or the like. In some embodiments, pouches 1381A and/or 1381B may be formed from a polymeric, plastic, paper, or metal foil material.

In some embodiments, pouches 1381A and/or 1381B may be cooled to prevent or inhibit the separation of constituent components of the paste material in pouches 1381A and/or 1381B (e.g., of paste 1350 or 1351). Pouches 1381A and/or 1381B may receive or contact a cooling agent to cause contents of the chamber to be cooled, similar to embodiments related to pouch 20, as shown in FIG. 1, and as discussed above.

In various embodiments, system 1300 may include more than two pouches, and in some embodiments, system 1300 may contain at least some of the chambers containing cereal paste or nut-based paste that are not flexible pouches. As used herein pouches 1381A and 1381B may be referred to as pouches or chambers interchangeably.

In various embodiments, chambers 1381A and 1381B may use separate conduits 1302A and 1302B, separate dispensing actuators 1320A and 1320B, separate valves 1385A and 1385B as well as separate static mixers/emulsifiers 29A and 29B for dispensing cereal paste 1350 or nut-based paste 1351 into mixing chamber 36. By separating dispensing lines of various products (herein dispensing line may refer to all of the components used to dispense a product, e.g., conduits, actuators, mixers, and valves), system 1300 is configured to prevent mixing of various products (e.g., prevent mixing of cereal paste 1350 and nut-based paste 1351).

Dispensing actuators 1320A and 1320B may be configured to dispense material, such as paste 1350 and 1351, from pouches 1381A-1381B into other components of system 1300. In some embodiments dispensing actuators, 1320A and/or 1320B may be a peristaltic pump (herein also referred to as peristaltic pump 1320A and/or peristaltic pump 1320B). The peristaltic pumps may dispense or dose material from the pouches into mixing chamber 36 via a static mixers 29A and/or 29B. Static mixers 29A and/or 29B may be configured to receive material exiting chambers 1381A and/or 1381B and to cause the material to be at least partially mixed by passing through the static mixers. Static mixers 29A and/or 29B may be similar to static mixer 26, as shown in FIG. 1.

In various embodiments, system 1300 may include a mixing chamber 36 configured to receive material from one of the pouches (e.g., via a conduit 1302A, or 1302B and/or static mixer 29A and/or 29B) and/or from other sources. In various embodiments, conduits 1302A and 1302B may be connected to chamber 36 via valves 1306A and 1306B. Valve 1305 may be configured to only allow the flow of cereal paste or nut-based paste from pouches 1381A or 1381B to mixing chamber 36. For example, valve 1305 may be a check valve or a poppet valve and/or the like. Similarly, conduit 1302A and 1302B may be connected to pouches 1381A and 1381B via respective valves 1385A and 1385B. For example, the opening of valve 1385A and/or 1381B may allow the flow of material from pouch 1381A (1381B) to mixing chamber 36 and may prevent flow from mixing chamber 36 towards pouch 1381A (1381B). In an example embodiment, valve 1385A and/or 1385B may be a check valve or a poppet valve and/or the like. In an example embodiment, when valve 1385A is open, valve 1385B may be closed, thus allowing only one type of material (e.g., only cereal paste 1350) to flow into mixing chamber 36. FIG. 13 shows, for example, that valve 1385B is closed, and valve 1385A is open. However, in an alternative configuration, several different products may be flown into mixing chamber 36. In an example embodiment, system 1300 may provide an interface for the user to adjust the flow rate of different products for a desired ratio of products within mixing chamber 36.

In an example embodiment (not shown in FIG. 13), system 1300 may include multiple mixing chambers (e.g., multiple chambers similar to mixing chamber 36). In some embodiments, system 1300 may include a plurality of subsystems with a subsystem from the plurality of subsystems is configured to dispense a subsystem related flowable product. For example, a first subsystem may be configured to dispense a nut-based beverage product and a second subsystem is configured to dispense a grain-based beverage product. In various cases, a subsystem may be the same or similar to system 10 shown in FIG. 1. In some embodiments, system 1300 may include an outlet configured to output a beverage product generated either by the first subsystem or by the second subsystem.

In various embodiments, system 1300 (or system 10) may be cleaned to prevent microbial growth and to maintain a sterile environment. In an example embodiment, a clean-in-place (CIP) system designed for cleaning system 1300 may be provided. CIP system may include periodic internal cleaning and may include a fully automated system with programmable logic controllers, multiple tanks, sensors, valves, heat exchangers, data acquisition and specially designed spray nozzle systems.

In an example embodiment, system 1300 may be cleaned with CIP cleaner such as AFCO 5229, AFCO 2548, 5222 HD CIP 20, AFCO 5235 Super CIP 200 and/or the like, and sanitized with CIP sanitizer such as AFCO 4325, PER OX SAN, AFCO 4312 VIGILQUAT and/or the like. In various embodiments, the cleaning liquids may be stored at high concentration in a locked area accessible by trained technicians with appropriate safety gear.

In some embodiments, the rinse cycle may include rinsing with hot water. For example, the water temperature may be between 30 to 100 degrees Celsius. In some cases, the rinse cycle may include dispensing water vapor inside mixing chamber 36. For example, in order to eliminate bacteria, water vapor at temperatures of about ten-to-few hundred degrees Celsius or higher may be used. In some cases, multiple rinse cycles may be used with water temperature being different between different cycles. In some embodiments, various other sanitizing techniques may be used to clean/disinfect inside surfaces of mixing chamber 36. For example, in some embodiments, a hot air (air of temperatures of about ten-to-few hundred degrees Celsius) may be dispensed within mixing chamber 36. In some embodiments, mixing chamber 36 may be irradiated by UV radiation in order to disinfect surfaces of chamber 36.

It should be noted, that UV radiation may be used for disinfection of various surfaces of system 1300 or system 10. For example, UV radiation may be used to disinfect various conduits (e.g., conduits 21A and/or 21B) as well as a region of system 10 in proximity of outlet 40. In some embodiments, plant-based beverage product (e.g., product 56, as shown in FIG. 1) may be irradiated by UV radiation to decrease the presence of microorganisms within product 56. For example, beverage product 56 may be placed in a UV transparent enclosure and may be irradiated with UV radiation in a wavelength range of 240-310 nanometers. The transparent enclosure may be formed from a UV transparent material such as quartz or fluoropolymer (e.g., EFEP, ETFE, and the like).

In some embodiments, when deeper cleaning is required, the rinse cycle may be followed by a dose cleaning cycle. The dose cleaning cycle may involve surfactants such as anionic surfactants, (e.g., alkylbenzene sulfonates, alkyl sulfates, alkyl ether sulfates and/or the like) or other surfactants (e.g., amphoteric or nonionic), caustic soda, and/or the like. In some cases, surfactants may be delivered via spray balls 701A and 701B, as shown in FIG. 7, and in some cases, surfactants may be delivered via a separate conduit connected to mixing chamber 36. In various embodiments, the deep cleaning cycle may be followed by a rinse cycle. In some embodiments, during the dose cleaning cycle mixing tool 42 may be activated in order to mix liquids (e.g., water with surfactants) dispensed into mixing chamber 36 during the dose cleaning cycle.

In some embodiments, a sanitizing cycle may be used. The sanitizing cycle may involve a sanitizing solution that may include sanitizing agents such as peracetic acid, chlorine, bromine, peroxides (e.g., hydrogen peroxide solution) and/or the like. In some cases, sanitizing agents may be delivered via spray balls 701A and 701B, as shown in FIG. 7, and in some cases, the sanitizing agents may be delivered via a separate conduit. In various embodiments, the sanitizing cycle may be followed by a rinse cycle. In some embodiments, during the sanitizing cycle mixing tool 42 may be activated in order to mix liquids (e.g., sanitizing solution) dispensed into mixing chamber 36 during the sanitizing cycle. During a cleaning cycle, an outlet 40, as shown in FIG. 1, may be closed using a valve (e.g., valve 878, shown in FIG. 8) in order to prevent cleaning liquids leaking out of chamber 36.

Figure 14:
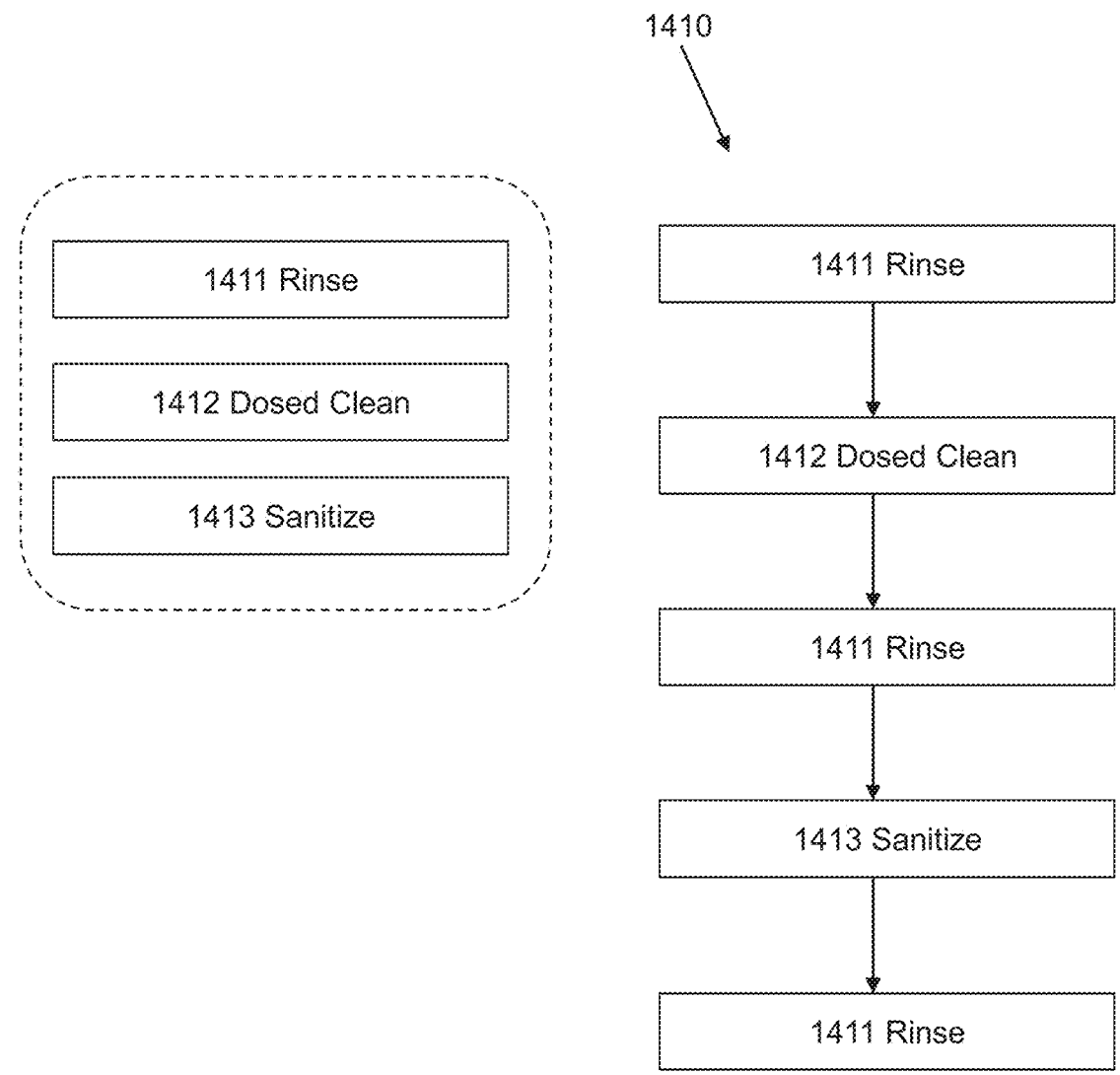
FIG. 14 is an example flowchart of a process of cleaning a mixing chamber, consistent with embodiments of this disclosure.

FIG. 14 shows that cleaning of mixing chamber 36 may involve steps of rinsing chamber 36 (a step 1411), dose cleaning chamber 36 (a step 1412), and sanitizing chamber 36 (a step 1413). Steps 1411-1413 may be used in any suitable combination. The last step during the cleaning of mixing chamber 36 may be step 1411 (i.e., rinsing of chamber 36). In an example embodiment, FIG. 14 shows a process 1410 for cleaning chamber 36 with a series of steps 1411, 1412, 1411, 1413, and 1411 executed one after another. It should be noted that any other suitable sequence of steps 1411-1413 may be used.

Figure 15:
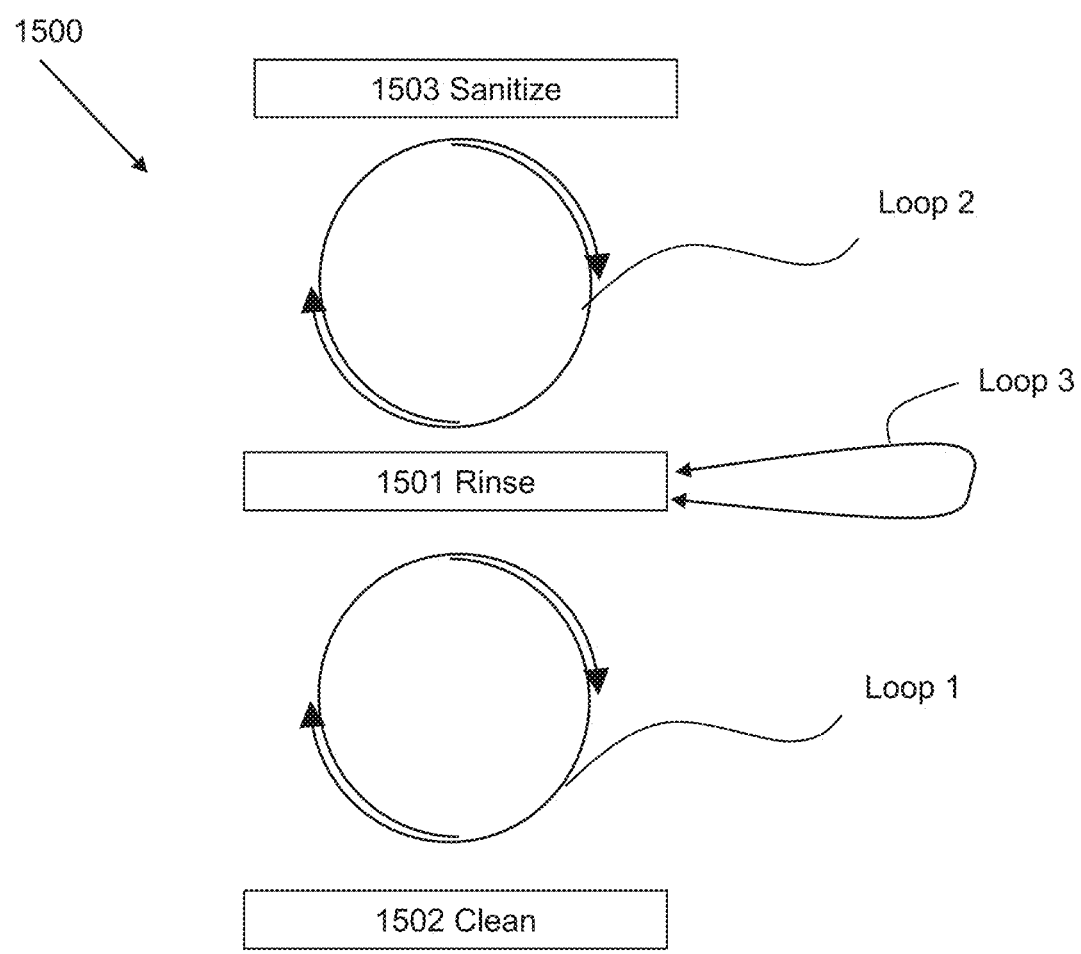
FIG. 15 is an example flowchart of an illustrative process of cleaning a dispensing system consistent with disclosed embodiments.

In various embodiment, the process of cleaning system 1300 (or system 10) may be described by a process 1500 shown in FIG. 15. At a step 1501 of process 1500, the system may be first pre-rinsed with water (e.g., purified water, water treated with disinfectants, heat or UV radiation, etc.) that may be performed to wet the interior surface of the mixing chamber 36, conduits 1302A and 1302B, and mixers 29A and 29B, and remove residue. It also may provide a non-chemical pressure test of the CIP flow path.

At a step 1502, a CIP cleaner may be introduced into the components of system 1300 (e.g., into mixing chamber 36, conduits 1302A and 1302B, and mixers 29A and 29B). In some embodiments, a doser may select the required dose (e.g., volume) for CIP cleaner prior to the introduction of the cleaner into the components of system 1300. In various embodiments, CIP concentrated cleaner may be diluted prior to being used for cleaning the components of system 1300. In various embodiments, CIP cleaner and/or water for diluting the cleaner may be maintained at the room temperature or be heated to a suitable temperature. The dose of concentrated CIP cleaner may be measured and controlled by any suitable means, including for example a Venturi System and can be delivered to the components of system 1300 via a doser/venturis. In various embodiments, CIP cleaner may be forced at high pressure/speed into the components of system 1300. Various valves may be opened or closed to control the output of pre-determined concentrations of CIP cleaner from the doser/venturis into mixing chamber 36. In various embodiments, CIP cleaner may include surfactants and caustics.

In various embodiments, process 1500 may include one or more iterations between steps 1501 and 1502 schematically indicated by a loop 1 in FIG. 15. For example, process 1500 may include a single sequence of step 1501 (rinse step) and step 1502 (clean step), or it may include several repeats of this sequence. Once loop 1 is completed, at a step 1503 the components of system 1300 may be sanitized. For example, at a step 1503, a CIP sanitizer may be introduced into the components of system 1300 (e.g., into mixing chamber 36, conduits 32A and 32B, and mixers 29A and 29B). In some embodiments, a doser may select the required dose (e.g., volume) for CIP sanitizer prior to the introduction of the sanitizer into the components of system 1300. In various embodiments, CIP concentrated sanitizer may be diluted prior to being used for cleaning the components of system 1300. In various embodiments, CIP sanitizer and/or water for diluting the cleaner may be maintained at the room temperature or be heated to a suitable temperature. The dose of concentrated CIP sanitizer may be measured and controlled by any suitable means, including for example a Venturi System and can be delivered to the components of system 1300 via a doser/venturis. In various embodiments, CIP sanitizer may be forced at high pressure/speed into the components of system 1300. Various valves may be opened or closed to control the output of pre-determined concentrations of CIP sanitizer from the doser/venturis into mixing chamber 36. In various embodiments, CIP sanitizer may include peracetic acids. In an example embodiment, CIP sanitizer may be left in mixing chamber 36 all the way down to the outlet 40 overnight to ensure no microbial growth.

In various embodiments, process 1500 may include one or more iterations between steps 1501 and 1503 schematically indicated by a loop 2 in FIG. 15. For example, process 1500 may include a single sequence of step 1501 (rinse step) and step 1503 (sanitize step), or it may include several repeats of this sequence. Once loop 1 is completed, the last cleaning step may be rinsed step 1501 that may be followed by blowing air through the components of system 1300 and drying the components.

Critical parameters must be met and remain within the specification for the duration of the cycle. If the specification is not reached or maintained, cleaning will not be ensured and will have to be repeated. Critical parameters include temperature, flow rate/supply pressure, chemical concentration, chemical contact time, and final rinse conductivity (which shows that all cleaning chemicals have been removed).

In various embodiments, system 1300 may be cleaned several times during the day. For example, the system may be cleaned in the morning, mid-day and at night. In various embodiments, mixing chamber 36 may be cold water rinsed as often as 5-20 minutes of system 1300 inactivity.

Figure 16:
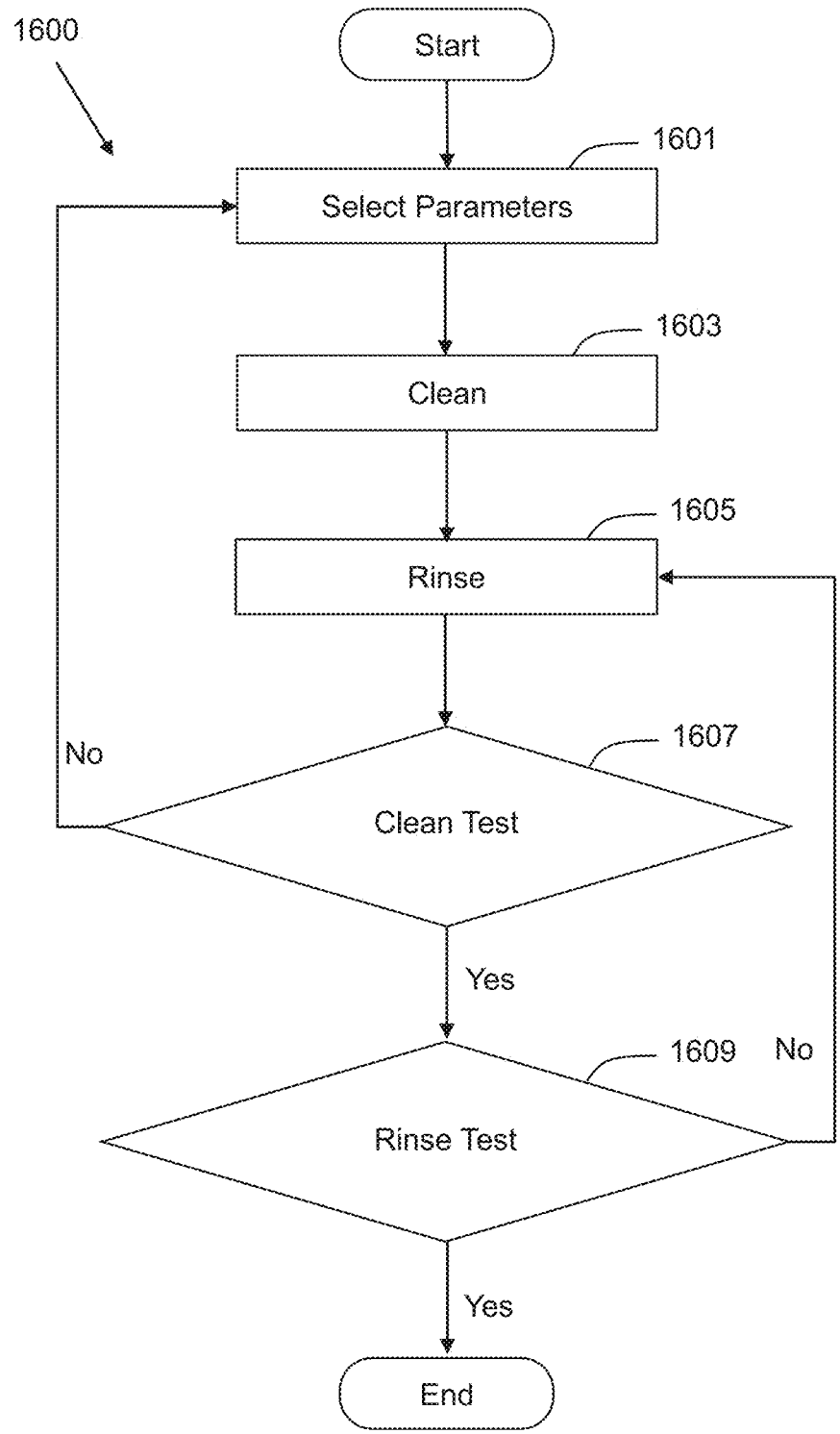
FIG. 16 is another example flowchart of an illustrative process of cleaning a dispensing system consistent with disclosed embodiments.

FIG. 16 shows an example process 1600 for cleaning system 1300 or system 10 consistent with disclosed embodiments. At step 1601 of process 1600, system 1300 may be configured to select parameters for cleaning. Such parameters may include a temperature of the water being used for cleaning system 1300 or/and concentration of cleaning chemicals. It should be noted that parameters for cleaning may be determined based on the cleaning requirements and requirements on chemicals, as well as the concentration of chemicals used during the cleaning process. At step 1603, CIP system may clean system 1300 using any of the suitable approaches, including the approaches described above. At step 1605, the CIP system may rinse system 1300 using any of the suitable approaches, including the approaches described above. At step 1607, the CIP system may perform a cleaning test. The cleaning test may use any of the suitable approaches for determining if components and surfaces of system 1300 or system 10 are cleaned. In an example embodiment, a clean test may be a reflectivity test (e.g., measurement of reflectivity of various surfaces and comparing reflectivity with predetermined values). For example, the reflectivity of surfaces may be altered due to the presence of the microbial film. Additionally, or alternatively, various visual tests may be performed for detecting microbial growth or for detecting surfaces that may need to be cleaned. For example, the visual test may include capturing images of surfaces and identifying using a computer-based model presence of contamination on various surfaces of system 1300. In some embodiments, a fluorescent test may be performed to determine the presence of the microorganisms. For example, a UV radiation (e.g., radiation in a wavelength range of 250-500 nm) may be used to determine the presence of microbial contamination based on fluorescent radiation emitted by microorganisms when exposed to UV radiation. If a clean test is not successful (step 1607, No), CIP system may be configured to return to step 1601 and repeat the cleaning process. If the clean test is successful (step 1607, Yes), the CIP system may be configured to perform a rinse test at step 1609. Rinse test determines if system 1300 is adequately rinsed (i.e., if cleaning chemicals are not present in the system). The rinse test may be conducted using any of the suitable approaches, such as using conductivity analysis. The conductivity analysis can help confirm that the rinse process is successful (e.g., most of all cleaning chemicals are removed). Since the various cleaning solutions are more conductive than the water used for flushing, conductivity measurement is a logical way to monitor the cleaning steps and the final rinse. If the rinse test is successful (step 1609, Yes), CIP system may conclude the cleaning process, and if the rinse test is not successful (step 1609, No) CIP system may be configured to return to rinse step 1605 and repeat step 1605 and subsequent tests at steps 1607 and 1609.

Figure 17:
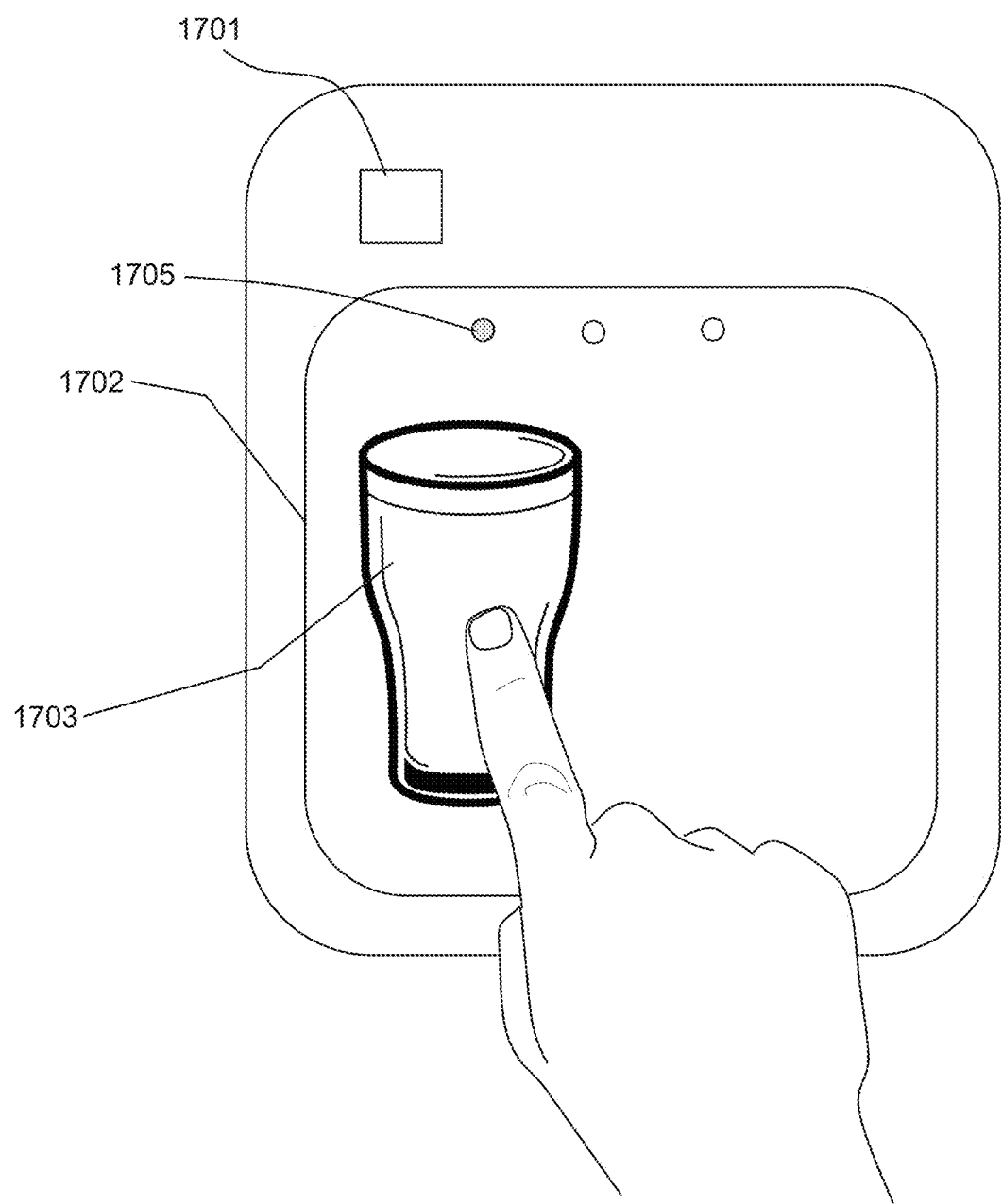
FIG. 17 is an example user interface for a dispensing unit for dispensing a dairy-free base beverage product, consistent with embodiments of this disclosure.
Figure 18:
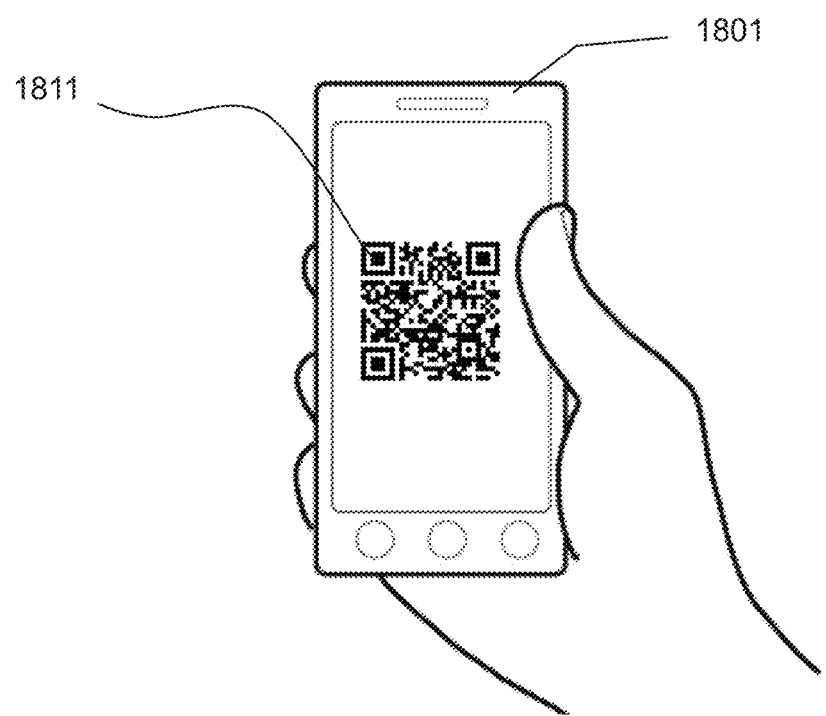
FIG. 18 is an example smartphone application for selecting a beverage product in accordance with user preferences, consistent with embodiments of this disclosure.

FIGS. 17 and 18 indicate various approaches for a user to interact with system 10 or system 1300. In an example embodiment, system 10 (1300) may be configured to present the user an interface for allowing the user to choose various parameters of a plant-based beverage product. In an example embodiment, the user may choose a type of plant-based beverage product (e.g., almond milk, oatmeal-based milk, and the like). Additionally, the user may choose the "creaminess" of the beverage product (e.g., product 56, as shown in FIG. 1). As used herein, the term creaminess defines the ration of paste 22 and water used for making beverage product 56. In some embodiments, the user may choose additives (e.g., vanilla, chocolate, etc.) for product 56. FIG. 17 shows that system 10 (1300) may include a button 1701 a touch screen 1702 containing graphical user interface (GUI) elements 1703 and 1705 or any other suitable means for controlling parameters of product 56. In an example embodiment, element 1703 may be a type of a drink that can be selected by the user, and element 1705 may indicate to the user the page and the number of pages available for the user for selecting beverage product 56.

FIG. 18 shown a mobile device 1801 (e.g., a smartphone, tablet, etc.) that may be used for selecting parameters of beverage product 56. In an example embodiment, mobile device 1801 may display a QR code 1811 that may contain information about parameters of beverage product 56. The QR code may be scanned by system 10 (system 1300) to transmit parameters of beverage product 56 to system 10.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure. As used herein, unless otherwise noted, the term "set" means one or more (i.e., at least one), and the phrase "any solution" means any now known or later developed solution.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A system for dispensing a flowable product, the system comprising:
    a mixing chamber having a first inlet, a second inlet and an outlet, the mixing chamber containing a mixing tool capable of motion;
    a paste located in an enclosure configured to flow into the mixing chamber via a first channel connected to the first inlet;
    a flowable medium configured to flow into the mixing chamber via a second channel connected to the second inlet;
    a cleaning in place system for cleaning the system; and
    wherein, using the mixing tool, the mixing chamber is configured to mix the paste and the flowable medium producing the flowable product, the flowable product being output via the outlet.

2. The system of claim 1, wherein the motion of the mixing element comprises a time-dependent motion.

3. The system of claim 1, further comprising a scale for weighting the mixing chamber.

4. The system of claim 3, wherein the flowable medium is first flowed into the mixing chamber followed by flowing the paste, and wherein the scale is configured to determine the weight of the flowable medium, and a weight of the paste.

5. The system of claim 1, further comprising a static mixer placed within the first channel, the static mixer configured to mix the paste prior to the paste entering the mixing chamber.

6. The system of claim 1, wherein the paste is flowed via the first channel using a pump.

7. The system of claim 6, wherein the pump comprises a peristaltic pump.

8. The system of claim 1, wherein the paste is contained in a replaceable pouch configured to connect to the first channel via a pouch-channel connection.

9. The system of claim 8, wherein the pouch-channel connection comprises a valve.

10. The system of claim 9, wherein the valve is a check valve.

11. The system of claim 1, further comprising a cooling system for cooling the flowable product located in the mixing chamber to a selected temperature.

12. The system of claim 1, further comprising a third channel for flowing an additive to the flowable product, wherein the additive is added after the flowable product is output from the outlet of the mixing chamber.

13. The system of claim 1, wherein the flowable medium comprises water, and wherein the paste comprises one of a nut-based paste or a grain-based paste.

14. The system of claim 1, wherein:
    the paste is configured to flow into the mixing chamber via the first inlet at a first flow rate;
    the flowable medium configured to flow into the mixing chamber via the second inlet at a second flow rate;
    the mixing chamber is configured to mix the paste and the flowable medium, producing the flowable product, the flowable product being output at a third flow rate via the outlet;
    a ratio of the first flow rate to the second flow rate is selected based on a required ratio of the paste to the flowable medium for the flow able product; and
    a ratio of the first flow rate to the third flow rate is selected based on a required degree of homogeneity of the flowable product.

15. The system of claim 1, wherein the cleaning in place system cleans the system automatically and periodically.

* * * * *